(12) United States Patent  
Chen

(10) Patent No.: US 12,482,220 B2  
(45) Date of Patent: Nov. 25, 2025

(54) IMAGE PROCESSING METHOD AND APPARATUS, COMPUTER DEVICE AND COMPUTER PROGRAM PRODUCT

(71) Applicant: TENCENT TECHNOLOGY (SHENZHEN) COMPANY LIMITED, Shenzhen (CN)

(72) Inventor: Fasheng Chen, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 370 days.

(21) Appl. No.: 18/325,988

(22) Filed: May 30, 2023

(65) Prior Publication Data

US 2023/0326174 A1  Oct. 12, 2023

Related U.S. Application Data

(63) Continuation of application No. PCT/CN2022/122377, filed on Sep. 29, 2022.

(30) Foreign Application Priority Data

Nov. 24, 2021 (CN) .......................... 202111405564.X

(51) Int. Cl.
*G06T 7/90* (2017.01)
*G06T 5/20* (2006.01)
(Continued)

(52) U.S. Cl.
CPC ................ *G06V 10/56* (2022.01); *G06T 5/20* (2013.01); *G06T 5/77* (2024.01); *G06T 7/90* (2017.01);
(Continued)

(58) Field of Classification Search
CPC ........ G06V 10/56; G06V 10/25; G06V 10/44; G06T 5/20; G06T 5/77; G06T 7/90;
(Continued)

(56) References Cited

U.S. PATENT DOCUMENTS 5,596,376 A * 1/1997 Howe ..................... H04N 19/61  
  375/E7.14  
6,137,904 A * 10/2000 Lubin ....................... G06T 5/50  
  382/162

(Continued)

FOREIGN PATENT DOCUMENTS

CN   105100646 A   11/2015  
CN   110915193 A    3/2020  
(Continued)

OTHER PUBLICATIONS

The World Intellectual Property Organization (WIPO) International Search Report for PCT/CN2022/122377 Dec. 20, 2022 7 Pages (including translation).

*Primary Examiner* — Ali Bayat  
(74) *Attorney, Agent, or Firm* — ANOVA LAW GROUP PLLC

(57) ABSTRACT

An image processing method includes: acquiring a project image, and acquiring a target chrominance component combination corresponding to each of pixel points in the project image; acquiring a first reference image, where a first mapping relation is present between each of location points in the first reference image and the chrominance component combination obtained from the chrominance components in the at least two chrominance channels; mapping, based on the first mapping relation, the target chrominance component combination to the first reference image to acquire a first mapping location point corresponding to the pixel point; determining a target processing feature corresponding to the pixel point according to a pixel feature of the first mapping (Continued)

location point in the first reference image; and processing the project image based on the target processing feature of each of the pixel points.

20 Claims, 16 Drawing Sheets

(51) Int. Cl.
  *G06T 5/77* (2024.01)
  *G06V 10/25* (2022.01)
  *G06V 10/44* (2022.01)
  *G06V 10/56* (2022.01)
(52) U.S. Cl.
  CPC .............. *G06V 10/25* (2022.01); *G06V 10/44* (2022.01); *G06T 2207/10024* (2013.01)
(58) Field of Classification Search
  CPC . G06T 2207/10024; G06T 7/11; G06T 7/194; G06T 2207/20221; G06T 5/50; H04N 1/60

USPC ......................................................... 382/167
  See application file for complete search history.

(56) References Cited

U.S. PATENT DOCUMENTS

| | | | |
|---|---|---|---|
| 2012/0229628 A1* | 9/2012 | Ishiyama | H04N 13/239 348/135 |
| 2014/0269903 A1* | 9/2014 | McCarthy | H04N 19/176 375/240.03 |
| 2018/0115777 A1* | 4/2018 | Piramanayagam | G06T 7/00 |
| 2020/0175663 A1 | 6/2020 | Horita et al. | |
| 2021/0192761 A1* | 6/2021 | Zhou | G06T 7/55 |
| 2023/0074060 A1 | 3/2023 | Chen | |

FOREIGN PATENT DOCUMENTS

| | | |
|---|---|---|
| CN | 112330531 A | 2/2021 |
| CN | 112991366 A | 6/2021 |
| CN | 113194317 A | 7/2021 |
| CN | 113724175 A | 11/2021 |
| WO | 2021179142 A1 | 9/2021 |

* cited by examiner

IMAGE PROCESSING METHOD AND APPARATUS, COMPUTER DEVICE AND COMPUTER PROGRAM PRODUCT

RELATED APPLICATION(S)

This application is a continuation application of PCT Patent Application No. PCT/CN2022/122377 filed on Sep. 29, 2022, which claims priority to Chinese Patent Application No. 202111405564X, entitled "IMAGE PROCESSING METHOD AND APPARATUS, COMPUTER DEVICE AND COMPUTER PROGRAM PRODUCT" filed on Nov. 24, 2021, to the Chinese Patent Office, all of which are incorporated herein by reference in entirety.

FIELD OF THE TECHNOLOGY

The present disclosure relates to the technical field of image processing, in particular to an image processing method and apparatus, a computing device, a storage medium and a computer program product.

BACKGROUND

With the development of image processing technology, a computing device may process an image by a variety of means, such as removing the background color in the image through image matting or changing the background color for the image.

In certain image processing technology, a computing device is often required to conduct complicated calculations and tedious adjustment operation for each of pixel points in an image according to the processing demand, which leads to low efficiency of image processing.

SUMMARY

According to various embodiments of the present disclosure, an image processing method and apparatus, a computing device, a storage medium and a computer program product are provided.

According to one aspect of the present disclosure, an image processing method is provided. The method includes:
acquiring a project image, and acquiring a target chrominance component combination corresponding to each of pixel points in the project image, where the target chrominance component combination is obtained from chrominance components of the pixel point in at least two chrominance channels respectively;
acquiring a first reference image, wherein a first mapping relation is present between each of location points in the first reference image and a chrominance component combination obtained from chrominance components in the at least two chrominance channels; the first reference image includes a first target region; the first target region is a region in which mapping location points corresponding to a target color category are distributed; the mapping location points corresponding to the target color category are obtained by mapping a candidate chrominance component combination of the target color category; and the candidate chrominance component combination is obtained from chrominance components of a candidate color of the target color category in the at least two chrominance channels, respectively;
mapping, based on the first mapping relation, the target chrominance component combination to the first reference image to acquire a first mapping location point corresponding to the pixel point;
determining a target processing feature corresponding to the pixel point according to a pixel feature of the first mapping location point in the first reference image; wherein the target processing feature matches a target location relation; and the target location relation characterizes a location relation between the first mapping location point and the first target region; and
processing the project image based on the target processing feature of each of the pixel points.

According to another aspect of the present disclosure, an image processing apparatus is further provided. The apparatus includes: a memory storing computer program instructions; and a processor coupled to the memory and configured to execute the computer program instructions and perform: acquiring a project image, and acquiring a target chrominance component combination corresponding to each of pixel points in the project image, where the target chrominance component combination is obtained from chrominance components of the pixel point in at least two chrominance channels respectively; acquiring a first reference image, wherein a first mapping relation is present between each of location points in the first reference image and a chrominance component combination obtained from chrominance components in the at least two chrominance channels; the first reference image includes a first target region; the first target region is a region in which mapping location points corresponding to a target color category are distributed; the mapping location points corresponding to the target color category are obtained by mapping a candidate chrominance component combination of the target color category; and the candidate chrominance component combination is obtained from chrominance components of a candidate color of the target color category in the at least two chrominance channels, respectively; mapping, based on the first mapping relation, the target chrominance component combination to the first reference image to acquire a first mapping location point corresponding to the pixel point; determining a target processing feature corresponding to the pixel point according to a pixel feature of the first mapping location point in the first reference image; wherein the target processing feature matches a target location relation; and the target location relation characterizes a location relation between the first mapping location point and the first target region; and processing the project image based on the target processing feature of each of the pixel points.

According to another aspect of the present disclosure, a computing device is further provided. The computing device includes: a memory and a processor, the memory storing computer-readable instructions, the computer-readable instructions, when executed by the processor, causing the processor to perform the steps of the image processing method.

According to another aspect of the present disclosure, a non-transitory computer-readable storage medium is further provided. The non-transitory computer-readable storage medium stores computer executable instructions thereon, and the computer-readable instructions, when executed by the processor, causes the processor to perform: acquiring a project image, and acquiring a target chrominance component combination corresponding to each of pixel points in the project image, where the target chrominance component combination is obtained from chrominance components of the pixel point in at least two chrominance channels respectively; acquiring a first reference image, wherein a first mapping relation is present between each of location points in the first reference image and a chrominance component combination obtained from chrominance components in the at least two chrominance channels; the first reference image includes a first target region; the first target region is a region in which mapping location points corresponding to a target color category are distributed; the mapping location points corresponding to the target color category are obtained by mapping a candidate chrominance component combination of the target color category; and the candidate chrominance component combination is obtained from chrominance components of a candidate color of the target color category in the at least two chrominance channels, respectively; mapping, based on the first mapping relation, the target chrominance component combination to the first reference image to acquire a first mapping location point corresponding to the pixel point; determining a target processing feature corresponding to the pixel point according to a pixel feature of the first mapping location point in the first reference image; wherein the target processing feature matches a target location relation; and the target location relation characterizes a location relation between the first mapping location point and the first target region; and processing the project image based on the target processing feature of each of the pixel points.

According to another aspect of the present disclosure, a computer program product is further provided. The computer program product includes computer-readable instructions, the computer-readable instructions, when executed by the processor, causing the processor to perform the steps of the image processing method.

Other aspects of the present disclosure may be understood by those skilled in the art in light of the description, the claims, and the drawings of the present disclosure.

Details of one or more embodiments of the present disclosure are provided in the accompanying drawings and descriptions below. Other features, objectives, and advantages of the present disclosure become apparent from the specification, the drawings, and the claims.

BRIEF DESCRIPTION OF THE DRAWINGS

To facilitate a better understanding of technical solutions of certain embodiments of the present disclosure, accompanying drawings are described below. The accompanying drawings are illustrative of certain embodiments of the present disclosure, and a person of ordinary skill in the art may still derive other drawings from these accompanying drawings without having to exert creative efforts. When the following descriptions are made with reference to the accompanying drawings, unless otherwise indicated, same numbers in different accompanying drawings may represent same or similar elements. In addition, the accompanying drawings are not necessarily drawn to scale.

DETAILED DESCRIPTION

To make objectives, technical solutions, and/or advantages of the present disclosure more comprehensible, certain embodiments of the present disclosure are further elaborated in detail with reference to the accompanying drawings. The embodiments as described are not to be construed as a limitation to the present disclosure. All other embodiments obtained by a person of ordinary skill in the art without creative efforts shall fall within the protection scope of embodiments of the present disclosure.

When and as applicable, the term "an embodiment," "one embodiment," "some embodiment(s), "some embodiments," "certain embodiment(s)," or "certain embodiments" may refer to one or more subsets of embodiments. When and as applicable, the term "an embodiment," "one embodiment," "some embodiment(s), "some embodiments," "certain embodiment(s)," or "certain embodiments" may refer to the same subset or different subsets of embodiments, and may be combined with each other without conflict.

In certain embodiments, the term "based on" is employed herein interchangeably with the term "according to."

Figure 1:
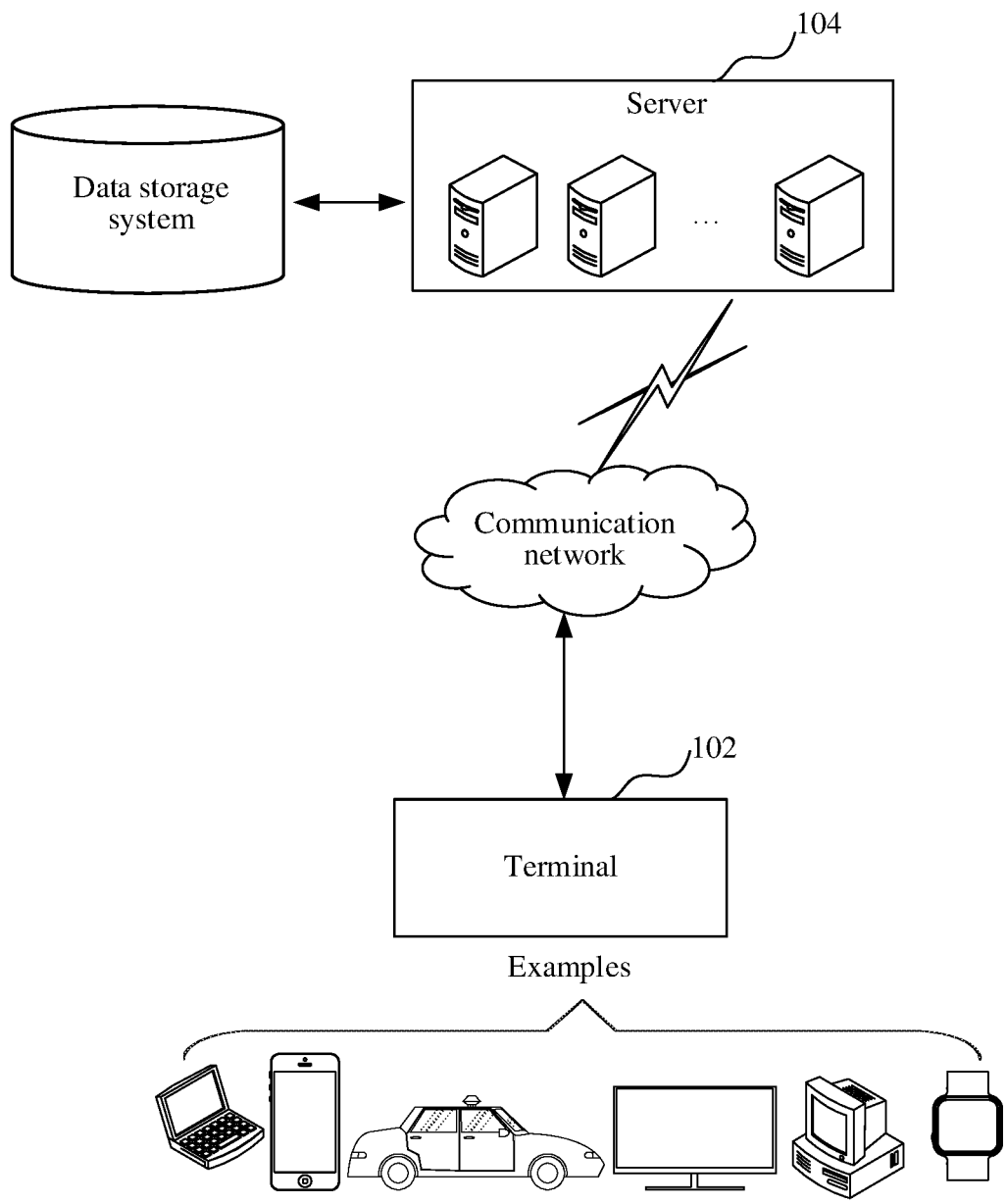
FIG. 1 is a diagram of an implementation environment of an image processing method according to certain embodiment(s) of the present disclosure.

An image processing method provided in an embodiment of the present disclosure may be applied to an implementation environment shown in FIG. 1. A terminal 102 communicates with a server 104 through a network. A data storage system may store images to be processed by the server 104 and images processed by the server. The data storage system may be integrated on the server 104 or placed on the cloud or other network servers. The terminal 102 may be, but not limited to, any desktop computer, notebook computer, smartphone, tablet computer, Internet of Things device and portable wearable device. The Internet of Things device may be a smart speaker, smart television, smart air conditioner, smart vehicle-mounted device, etc. The portable wearable device may be a smartwatch, smart bracelet, head-mounted device, etc. The terminal may be provided with a client, through which the terminal may obtain a project image. In certain embodiment(s), the project image is an image to be processed. The server 104 may be implemented by using an independent server or a server cluster or cloud server that includes a plurality of servers.

The terminal and the server may either cooperatively execute the image processing method of the present disclosure, or execute the image processing method of the present disclosure separately. For example, in response to that the terminal and the server may cooperatively execute the image processing method of the present disclosure, the terminal transmits a project image inputted by a user to the server, and the server receives the project image. Then, the image processing method includes: acquiring a target chrominance component combination corresponding to each of pixel points in the project image; acquiring a first reference image; mapping, based on the first mapping relation, the target chrominance component combination to the first reference image to acquire a first mapping location point corresponding to the pixel point; determining a target processing feature corresponding to the pixel point according to a pixel feature of the first mapping location point in the first reference image; and processing the project image based on the target processing feature of each of the pixel points.

It is to be understood that, according to the embodiments of the present disclosure, the first reference image includes a first target region; the first target region is a region in which mapping location points corresponding to a target color category are distributed; the mapping location points corresponding to the target color category are obtained by mapping a candidate chrominance component combination of the target color category; and the candidate chrominance component combination is obtained from chrominance components of a candidate color of the target color category in the at least two chrominance channels, respectively. In addition, a target processing feature determined according to a pixel feature of the first mapping location point matches the location relation between the first mapping location point and the first target region. That is, during the process of determining the target processing feature in the embodiments of the present disclosure, the location relation between the first mapping location point and the first target region is utilized. Given that the target processing feature location relation may be determined using the location relation, a transparency characterization value of the first target region may be calculated as a whole, which omits the operation of calculating the transparency characterization value for each candidate color of the target color category, and in turn improves the image processing efficiency.

Figure 2:
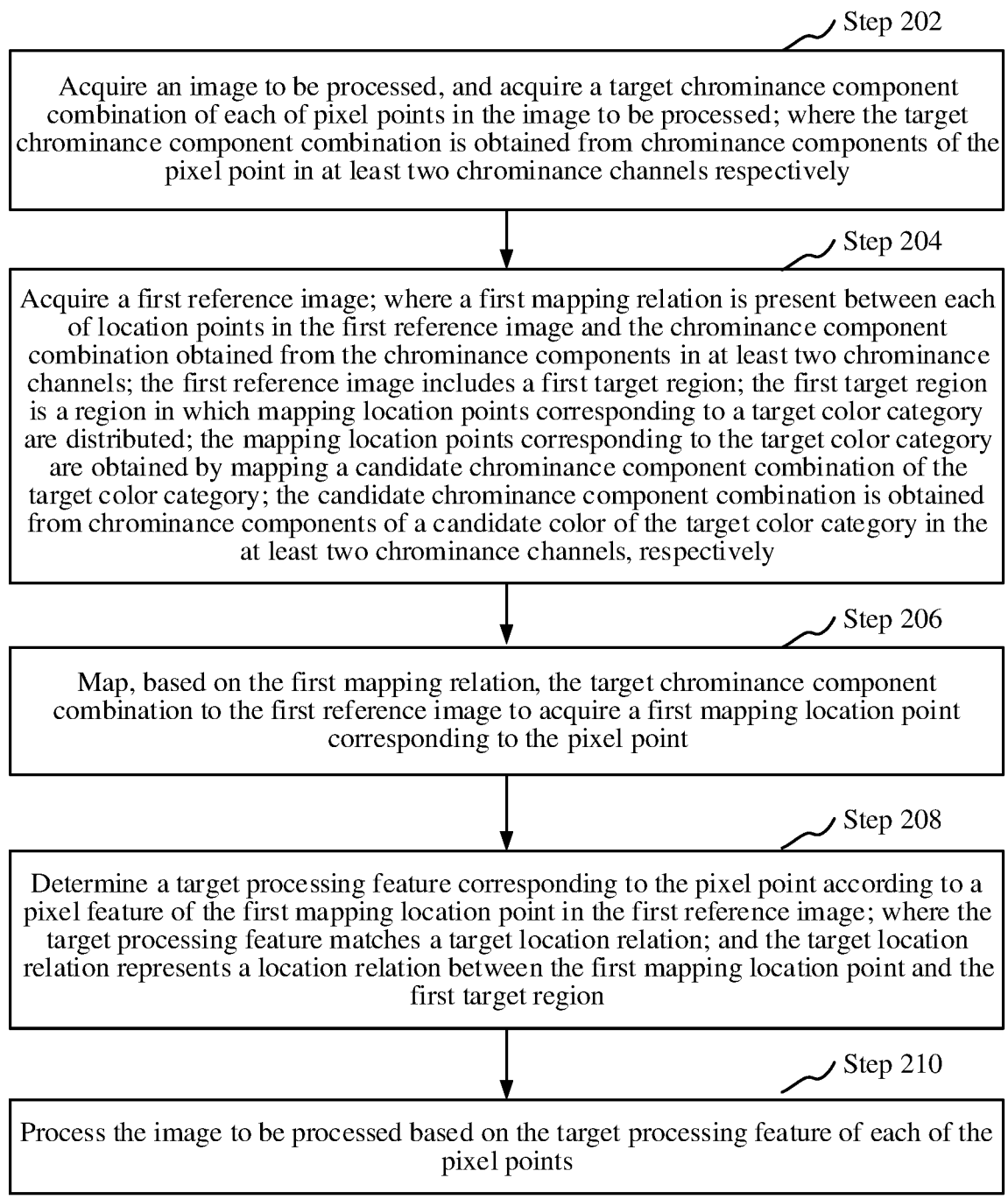
FIG. 2 is a schematic flowchart of an image processing method according to certain embodiment(s) of the present disclosure.

In one embodiment, as shown in FIG. 2, an image processing method is provided and applied to a computing device. The computing device may be a terminal, or a server, or a system including a terminal and a server. This embodiment is described by using an example in which the method is applied to the server in FIG. 1. The method includes:

Step 202, Acquire a project image, and acquiring a target chrominance component combination of each of pixel points in the project image, where the target chrominance component combination is obtained from chrominance components of the pixel point in at least two chrominance channels respectively.

The project image refers to an image that is to be processed. The project image includes an image region belonging to the target color category. In one embodiment, the project image may be an image obtained by photographing a target object with a screen of the target color category as the background. The target color category may be a variety of color categories, such as blue or green. The target object may be a variety of living things or non-living things, depending on details in different scenes. It is to be understood that, for each color category, there are multiple candidate colors. For example, under different degrees of saturation, green may be shown as grayish green, light green, dark green, etc.

The target chrominance component combination is obtained from chrominance components of pixel point in at least two chrominance channels respectively. As a color channel for characterizing the size of chrominance, the chrominance channel is configured to specify the color of a pixel by describing the color and saturation. At least two chrominance channels refer to two or more chrominance channels. For example, in a YUV color space, at least two color channels may be a U color channel and a V color channel. A chrominance component of the chrominance channel is used for characterizing the size of chrominance of the chrominance channel. The chrominance component may be a gray value. For example, the gray value may range from 0 to 255.

In certain embodiment(s), the terminal acquires a project image and transmits the project image to the server. Upon receiving the project image, the server begins to process the image. During processing, the server may acquire a target chrominance component combination of each of pixel points in the project image.

In one embodiment, the process that the server acquires a target chrominance component combination corresponding to the pixel point may be implemented as follows: The server acquires chrominance components of the pixel point in at least two chrominance channels respectively, and arranges the acquired chrominance components in a preset order to acquire the target chrominance component combination. For example, assuming that the at least two chrominance channels are U channel and V channel, and the preset order is the U channel first and the V channel later, if the chrominance component of a pixel point in the U channel is u1 and the chrominance component of the pixel point in the V channel is v1, the target chrominance component combination (u1, v1) corresponding to the pixel point is acquired. In other embodiments, while receiving the project image, the server may receive the target chrominance component combination corresponding to each pixel point, that is, the target chrominance component combination is predetermined by the terminal.

It is to be understood that, in some embodiments, when receiving the project image and channel values of the project image in other color spaces, the server may convert the channel values of other color spaces to a color space containing chrominance channels. For example, assuming that the server receives the project image and channel values of each of pixels of the project image in the RGB color space, the gray values of the red (R) channel, the green (G) channel and the blue (B) channel in the RGB color space may be converted into the gray values of the Y channel, U channel and V channel in the YUV color space.

In one embodiment, an image processing application may be installed on the terminal, through which the terminal may call a camera of the terminal to capture the project image. In other embodiments, the terminal may also select an image from pre-stored images as a project image by using the image processing application.

Step 204: Acquire a first reference image. A first mapping relation is present between each of location points in the first reference image and the chrominance component combination obtained from the chrominance components in at least two chrominance channels. The first reference image includes a first target region. The first target region is a region in which mapping location points corresponding to a target color category are distributed. The mapping location points corresponding to the target color category are obtained by mapping a candidate chrominance component combination of the target color category. The candidate chrominance component combination is obtained from chrominance components of a candidate color of the target color category in the at least two chrominance channels, respectively.

The first reference image is an image pre-generated and saved by the server. A first mapping relation is present between each of location points in the first reference image and the chrominance component combination obtained from the chrominance components in at least two chrominance channels. The first mapping relation indicates that for each location point in the first reference image, there is a corresponding chrominance component combination, and the chrominance component combination may vary depending on different location points. In one embodiment, a coordinate axis may be determined with the chrominance channels, and a coordinate system may be established in the first reference image, thereby establishing a mapping relation between the chrominance component combination and the location points in the first reference image. For example, assuming that at least two chrominance channels are Y channel and U channel, a rectangular coordinate system may be established in the first reference image with the Y channel as a Y-axis, the U channel as an X-axis, and one of the vertices of the first reference image as an origin.

Figure 3:
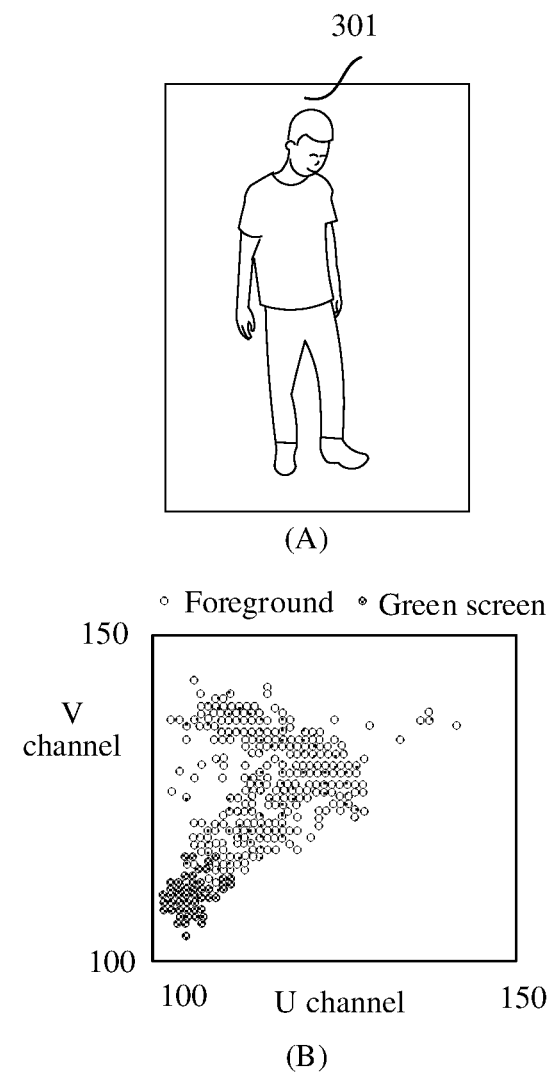
FIG. 3 is a schematic diagram of a location point in a first reference image according to an embodiment.

It is to be understood that, for a color space defined by the chrominance channel, if the candidate colors belonging to the same color category are represented as scattered dots, these points are concentrated in one region. Given that a first mapping relation is present between each of location points in the first reference image and the chrominance component combination obtained from the chrominance components in at least two chrominance channels, mapping location points corresponding to the target color category are concentrated in one region of the first reference image. For example, FIG. 3 is a schematic diagram of a location point in a first reference image according to an embodiment. FIG. 3(A) is obtained by photographing a target object 301 with a green screen as the background, where the color category of the background of the figure is green. FIG. 3(B) is obtained by mapping each pixel point in FIG. 3(A) to a UV coordinate system of FIG. 3(B). As may be seen from FIG. 3(B), when the green screen is used as the background, the mapping location points of the background color are distributed in a circle. The UV coordinate system of FIG. 3(B) is established with the U channel in the YUV color space as an X-axis, the V channel as a Y-axis, and the lower left corner of the image as an origin.

Since the mapping location points corresponding to the target color category are concentrated in one region, when the first reference image is to be established, the region in which the mapping location points corresponding to the target color category are distributed may be determined as the first target region. The mapping location points corresponding to the target color category are obtained by mapping a candidate chrominance component combination of the target color category. The candidate chrominance component combination is obtained from chrominance components of a candidate color of the target color category in the at least two chrominance channels, respectively. The target color category herein refers to the color type of the pixel to be processed when the image is processed in the current implementation scenario. In one embodiment, when the current implementation scenario involves matting for an image background, the target color category is the color of the image background. For example, regarding an image captured with a green screen as the background, the target color category may be green.

In one embodiment, the first target region may be a region where some of candidate colors of the target color category are distributed. For example, in FIG. 3(A) captured with a green screen as the background, the greens presented in the background have saturation within a normal range, and the region where these greens are distributed in FIG. 3(B) is substantially a circular region. It is to be understood that, if the circular region is taken as the first target region, the first target region does not contain mapping location points corresponding to greens with excessively low saturation and mapping location points corresponding to greens with excessively high saturation.

In certain embodiment(s), after acquiring the project image and the target chrominance component combination corresponding to each of pixel points in the project image, the server may further acquire a pre-established first reference image and continue to process the project image based on the first reference image.

Step 206: Map, based on the first mapping relation, the target chrominance component combination to the first reference image to acquire a first mapping location point corresponding to the pixel point.

In certain embodiment(s), for each of pixel points in the project image, the server determines the location point corresponding to the target chrominance component combination corresponding to each of pixel points in the first reference image based on the first mapping relation, and takes the location point as the first mapping location point corresponding to the pixel point.

For example, assuming that the at least two channels are Y channel and U channel, the first mapping relation between the chrominance component combination and each of location points in the first reference image is established through a coordinate system with the V channel as the Y-axis, the U channel as the X-axis, and one of the vertices in the first reference image as the origin. Assuming that the chrominance component of a pixel point in the V channel is y1, and the chrominance component of the pixel point in the X channel is x1, the first mapping location point of the pixel point in the first reference image is (x1, y1).

Step 208: Determine a target processing feature corresponding to the pixel point according to a pixel feature of the first mapping location point in the first reference image; where the target processing feature matches a target location relation; and the target location relation characterizes a location relation between the first mapping location point and the first target region.

The pixel feature refers to a feature represented by a pixel point. The pixel feature of the first mapping location point in the first reference image may be a feature represented by the pixel point of the first mapping location point in the first reference image, which may be a location or a gray value of the pixel. The target processing feature corresponding to a pixel point refers to the feature of the pixel point that is used for image processing. The target processing feature may be a transparency characterization value or a color characterization value, where the color characterization value is the component of each color channel in a given color space, such as R channel component, G channel component and B channel component in RGB color space, or the Y channel component, U channel component, and V channel component in the YUV color space. The transparency characterization value is used for characterizing the degree to which the layer is difficult to be seen through by sight. The transparency characterization value may be transparency or non-transparency. It is to be understood that, although both transparency and non-transparency may characterize the degree to which the layer is difficult to be seen by sight, the two under the same value represent different degrees to which the layer is difficult to be seen through by sight. For example, in response to that the transparency characterization value is transparency, when the transparency characterization value of a pixel is 0, the pixel is transparent and will not be displayed, while in response to that the transparency characterization value is non-transparency, when the transparency characterization value of a pixel is 0, the pixel is displayed. In implementation, the transparency characterization value may be a value corresponding to Alpha channel.

When the target processing feature matches the target location relation, it indicates that the target processing feature is consistent with the processing feature determined by the target location relation. The target location relation characterizes a location relation between the first mapping location point and the first target region. The location relation may indicate that the first mapping location point is within the first target region or the first mapping location point is outside the first target region.

In one embodiment, in the process of generating the first reference image, the server may determine the processing features of each of location points in advance according to the location relation between each location point and the first target region in the first reference image, and establish the correspondence between the pixel feature of the location point and the corresponding processing feature, where different location relations correspond to different processing features. Thus, after acquiring the first mapping location point corresponding to the pixel point in the project image, the server may directly query the pre-established correspondence according to the pixel feature of the first mapping location point, thus acquiring the target processing feature corresponding to the pixel point.

In another embodiment, after acquiring a first mapping location point corresponding to a pixel point, the server may determine the location relation between the first mapping location point and the first target region according to the pixel feature of the first mapping location point in the first reference image, and acquire a target processing feature matching the location relation based on the determined location relation. For example, assuming that the processing feature is a transparency characterization value, when the determined location relation indicates that the first mapping location point is within the first target region, the first transparency characterization value is determined, and may shield the pixel; when the determined location relation indicates that the first mapping location point is outside the first target region, the second transparency characterization value is determined, and may display the pixel normally. Thus, the color of the target color category in the image may be determined.

Step 210: Process the project image based on the target processing feature of each of the pixel points.

In certain embodiment(s), the server may acquire the target processing feature of each of pixel points in the project image according to the steps, and may process the project image based on these target processing features.

In one embodiment, when the target processing feature is transparency, the server may set a transparency characterization value for each pixel location in the project image based on the transparency characterization value of each pixel point, thus processing the project image. After the transparency characterization value is set, the region with transparency of 0 is not displayed, so it may be applied to matting for the background color in the image.

In another embodiment, when the target processing feature is a color characterization value, the server may change the color of each pixel location in the project image based on the color characterization value of each pixel point, thus processing the project image. It may be applied to change the background color in the image.

In the image processing method, after the project image is acquired, the target chrominance component combination corresponding to each of the pixel points in the project image is acquired, and the first reference image including the first target region is further acquired. Due to a first mapping relation between the location points in the first reference image and the chrominance component combination obtained from the chrominance components of at least two chrominance channels, the first mapping location point corresponding to the pixel point may be acquired by mapping the target chrominance component combination to the first reference image based on the first mapping relation. Since the first target region is the region where the mapping location points corresponding to the target color category are distributed, and the mapping location points corresponding to the target color category are acquired by mapping the candidate chrominance component combination of the target color category, the distribution features of the target color category in the color space defined by at least two chrominance components may be reflected, the target processing features that may be used for processing the image may be determined according to the location relation between the first mapping location point and the first target region, and the project image may be processed according to the target processing features, which not only omits the complex calculation process and tedious operation, but also improves image processing efficient.

In one embodiment, the image processing method further includes the operation of determining a first target region, which includes: acquire a preset chrominance component combination, and map the preset chrominance component combination to the first reference image based on the first mapping relation to acquire a mapping location point corresponding to the preset chrominance component combination; acquire a color rendering range value corresponding to a desired background color rendering range of the target color category; where the color rendering range value is positively correlated with the size of the desired background color rendering range; determine a center mapping location point corresponding to the desired background color rendering range on the first reference image based on the mapping location point corresponding to the preset chrominance component combination; and determine the first target region on the first reference image based on the center mapping location point and the color rendering range value.

The preset chrominance component combination is a chrominance component combination inputted by the user based on experience and corresponding to a candidate color of the target color category. The preset chrominance component combination may be a chrominance component combination corresponding to a primary color of the target color category. Taking green as an example, the preset chrominance component combination may be a chrominance component combination corresponding to a primary color of the green. The primary color refers to the purest color, that is, the basic color, which is not mixed with any other color. The desired background color rendering range refers to the distribution range of candidate colors of the target color category desired by the user and presented in the image background in the color space formed by the at least two chrominance channels. The center mapping location point corresponding to the desired background color rendering range refers to the in-between location of the mapping region corresponding to the desired background color rendering range, where the mapping region refers to a region where mapping location points of the candidate colors belonging to the desired background color rendering range are distributed on the first reference image. The color rendering range value is used for characterizing the size of the desired background color rendering range, and is positively correlated with the size of the desired background color rendering range. That is, the larger the desired background color rendering range, the larger the color range value; the smaller the desired background color range value, the smaller the color range. When the mapping region corresponding to the desired background color rendering range is a circle, the color rendering range value may be the radius of the circle, and the center mapping location point may be the center of a circle.

In certain embodiment(s), the server may acquire a preset chrominance component combination, map the preset chrominance component combination to the first reference image based on the first mapping relation to acquire a corresponding mapping location point, further acquire the color rendering range value corresponding to the desired background color rendering range, and determine the first target region on the first reference image based on the center mapping location point and the color rendering range value.

Figure 4:
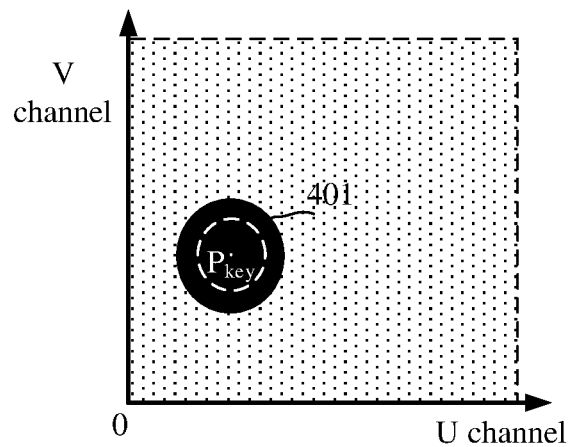
FIG. 4 is a schematic diagram of a first target region according to an embodiment.

In one embodiment, the project image is the image of the target object captured with the screen of the target color category as the background, and the color rendering range value may be a value inputted by the user based on experience. Given that the candidate colors presented in the background of the project image are distributed in a circle, the desired background color rendering may be a circle, and the mapping region corresponding to the background color rendering range is also a circle, with the color rendering range value inputted by the user as the radius of the circle. The server may directly determine the mapping location point corresponding to the preset chrominance component combination as the center mapping location point corresponding to the desired background color rendering range, that is, the mapping location point corresponding to the preset chrominance component combination is taken as the center of a circle. Based on the center of a circle and radius, the region of a circle on the first reference image may be determined. The server may determine the region where the circle is located as the first target region. For example, FIG. 4 shows a schematic diagram of a first target region according to an embodiment. The region where circle 401 is located in FIG. 4 is the first target region. $P_{key}$ represents the center of a circle.

Figure 5:
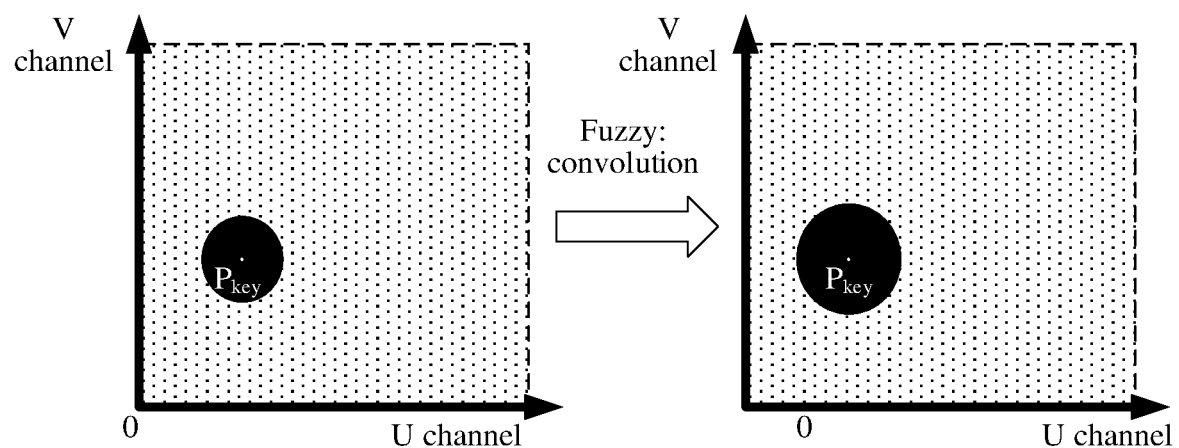
FIG. 5 is a schematic diagram of a first target region after fuzzy processing according to certain embodiment(s) of the present disclosure.

In one embodiment, the project image is processed by conducting background matting for the project image. In order to realize background matting, the pixel corresponding to the internal location point of the circle in the project image may be set to be transparent, and the pixel corresponding to the external location point of the circle may be set to be non-transparent, thus realizing matting. On this basis, the server may fill the gray value of the region inside the circle in the first reference image with 0 and fill the gray value of the region outside the circle with 255, and establish a relation between the gray value of 0 and the first transparency characterization value and a relationship between the gray value of 255 and the second transparency characterization value, where the first transparency characterization value is used for shielding pixels, that is, it represents transparency; while the second transparency characterization value may display pixels, that is, it represents non-transparency. In a embodiment, in order to ensure a smooth transition of the transparency characterization value calculated from a semitransparent region, a preset gradient intensity a may be obtained, and fuzzy processing with a size of a*p may be performed in the first reference image. The gradient intensity a is a hyper-parameter with an interval of [0,1]. Fuzzy processing may be any one of mean fuzzy processing, Gaussian fuzzy processing and circular convolution kernel-based fuzzy processing. FIG. 5 shows a schematic diagram of a first target region after fuzzy processing according to an embodiment. As may be seen from FIG. 5, pixel points at the boundary of a circle may be subject to smooth transition after convolutional fuzzy processing, and the effect of gradual change of transparency characterization values with colors may be added to the circle after fuzzy processing (that is, the first target region), so that the matting quality featured by smooth edges may be obtained during matting.

Figure 6:
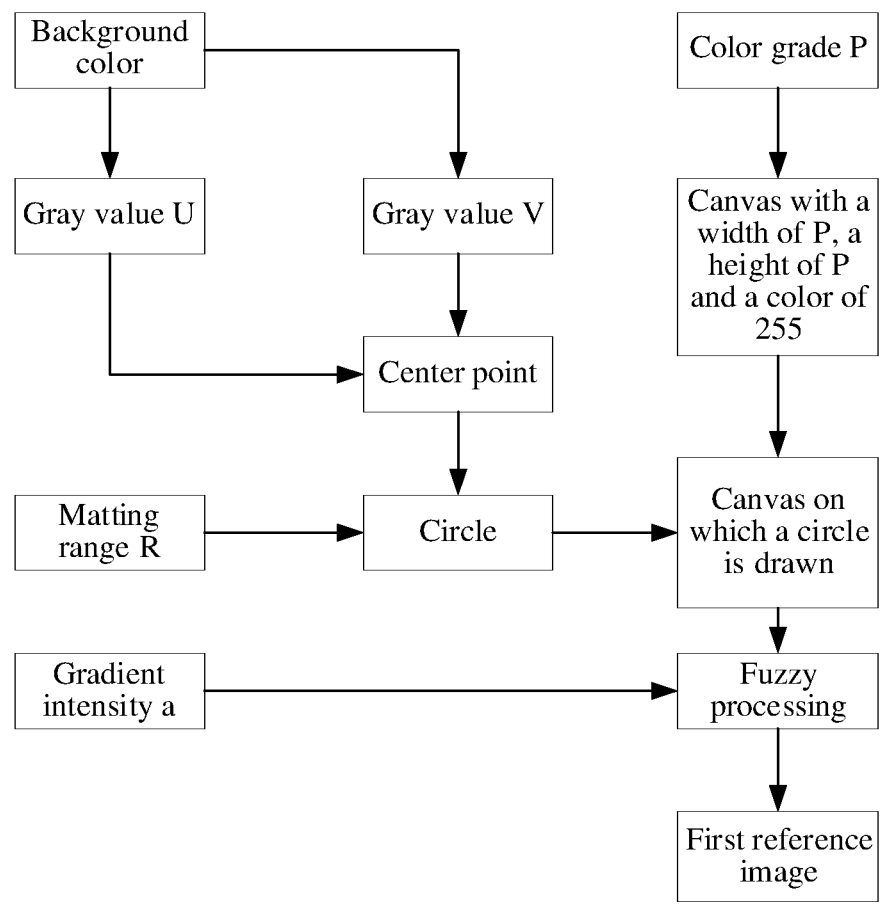
FIG. 6 is a schematic flowchart of generating a first reference image according to certain embodiment(s) of the present disclosure.

FIG. 6 shows a schematic flowchart of generating a first reference image according to an embodiment. Referring to FIG. 6, the user first inputs the gray value of the background color (that is, the target color category) in the U channel and the gray value in the V channel, as well as a matting range R (that is, the color rendering range value), sets the color grade P (for an 8-bit image, the color grade is the eighth power of 2, that is, 256), prepares a canvas with a width of P, a height of P and a gray value of P, and establishes a UV coordinate system in the canvas. A center point $P_{key}$ may be determined based on the gray value in the U channel and the gray value in the V channel inputted by the user; based on the center point $P_{key}$ and R, the region of the circle in the two-dimensional image may be determined; a canvas painted with the circle is obtained by filling the region inside the circle with the gray value of 0 and filling the region outside the circle with the gray value of 255; the gradient intensity a is acquired and used for fuzzy processing on the canvas, and finally the first reference image is acquired. For the first reference image acquired, reference may be made to the image after convolutional fuzzy processing in FIG. 5. With the first reference image, it is possible to achieve matting for the background color from the project image.

In this embodiment, a corresponding mapping location point is obtained by mapping the preset chrominance component combination to the first reference image, and a center mapping location point corresponding to the desired background color rendering range may be determined through the mapping location point. Thus, after a color rendering range value is acquired, the first target region may be determined based on the color rendering range value and the center mapping location point, and the first target region may be quickly determined from the first reference image.

In one embodiment, a color rendering range value corresponding to the desired background color rendering range is acquired according to the following operations: acquire an inputted color gamut angle and a target segment length; where the color gamut angle is positively correlated with the size of a color gamut of the target color category in a target color space; the target color space is a color space determined according to the at least two chrominance channels; and the target segment length is positively correlated with the size of a foreground color rendering range in the color gamut; and determine the color rendering range value based on the color gamut angle and the target segment length.

Figure 7:
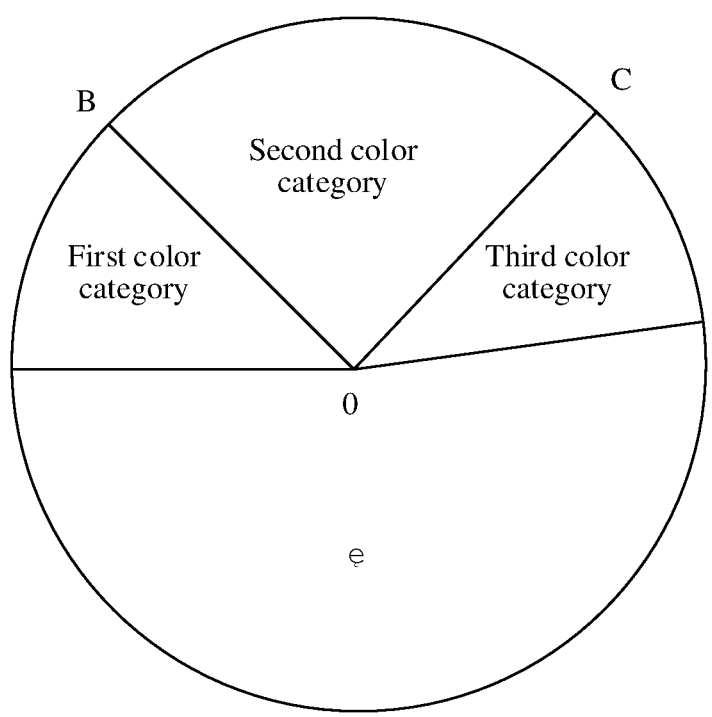
FIG. 7 is a schematic diagram of a target color space according to certain embodiment(s) of the present disclosure.

The color gamut of the target color category in the target color space refers to a region formed by all candidate colors of the target color category in the target color space, and the target color space refers to a color space formed by at least two chrominance components, such as a YUV color space. For example, as shown in FIG. 7, assuming that a color gamut formed by all colors in the target color space is a circle with the center of a circle 0 as neutral gray, the region formed by all candidate colors of the first color category as sector AOB, the region formed by all candidate colors of the second color category as sector COB, and the region formed by all candidate colors of the third color category as sector COD, the color gamut of the first color category is a sector region AOB, the color gamut of the second color category is the sector region COB, and the color gamut of the third color category is the sector region COD. Regarding the first color category, the color gamut angle is angle AOB; regarding the second color category, the color gamut angle is angle COB; and regarding the third color category, the color gamut angle is angle COD. It may be seen that the larger the color gamut angle is, the larger the fan-shaped region. That is, the color gamut angle is positively correlated with the size of the color gamut.

It is to be understood that, in this embodiment, the mapping relation between each of the location points and the chrominance component combination in the first reference image is obtained by establishing a rectangular coordinate system in the first reference image with the chrominance channel as the coordinate axis. Therefore, the color gamut of the target color category is still a sector when it is mapped to the plane of the first reference image, so the color gamut angle is an included angle of the sector region of the color gamut of the target color category mapped on the first reference image.

The target segment length is positively correlated with the size of a foreground color rendering range in the color gamut. The foreground color rendering range refers to a range formed in the target color space by candidate colors belonging to the target color category presented in the foreground. Candidate colors that belong to the target color category within the foreground color rendering range are less saturated since they are mixed with other colors in the foreground. By way of example, when the project image is captured with a green screen (hereinafter referred to as the green screen) as the background, the candidate colors belonging to the target color category in the foreground of the project image are usually reflected by the green screen. For example, objects such as human hair and edges of clothing are rendered to grayish green with low saturation under the reflection of the green screen. The target segment length is positively correlated with the size of a foreground color rendering range in the color gamut. That is, the larger the foreground color rendering range, the longer the target segment length. On the contrary, the smaller the foreground color rendering range, the shorter the target segment length.

It is to be understood that, in the target color space, the color saturation increases gradually with the neutral gray as the initial point. Referring to FIG. 7, where the center of a circle O represents neutral gray, regarding the color gamut of each color category, the closer it is to the center, the lower the saturation; each location in the color gamut may represent a candidate color, and the greater the distance between the location and the center of a circle, the higher the saturation. On this basis, it may be determined that the foreground color rendering range is in a region close to the center of a circle, while the desired background color rendering range is in a region close to the middle of a sector. Assuming the desired background color rendering range is a circle tangent to the boundary of the color gamut, the mapping region of the desired background color rendering range in the first reference image is also a circle which is tangent to the boundary of the mapping region in the first mapping image corresponding to the color gamut of the target color category, the server may determine the color rendering range value as the radius of the circle based on the color gamut angle and the target segment length.

In one embodiment, assuming that the color gamut angle inputted by the user is O, and the target segment length d represents the distance between the mapping location point of neutral gray in the first reference image and the center mapping location point corresponding to the desired background color rendering range, the color rendering range value r may be calculated according to the following formula (1):

$$r = dg \sin\frac{\theta}{2} \quad (1)$$

In one embodiment, assuming that the color gamut angle inputted by the user is O, and the target segment length d represents the difference between the distance from the mapping location point of neutral gray in the first reference image to the center mapping location point corresponding to the desired background color rendering range and the color rendering range value, the color rendering range value r may be calculated according to the following formula (2):

$$r = \frac{dg \sin\frac{\theta}{2}}{1 - \sin\frac{\theta}{2}} \quad (2)$$

Figure 8:
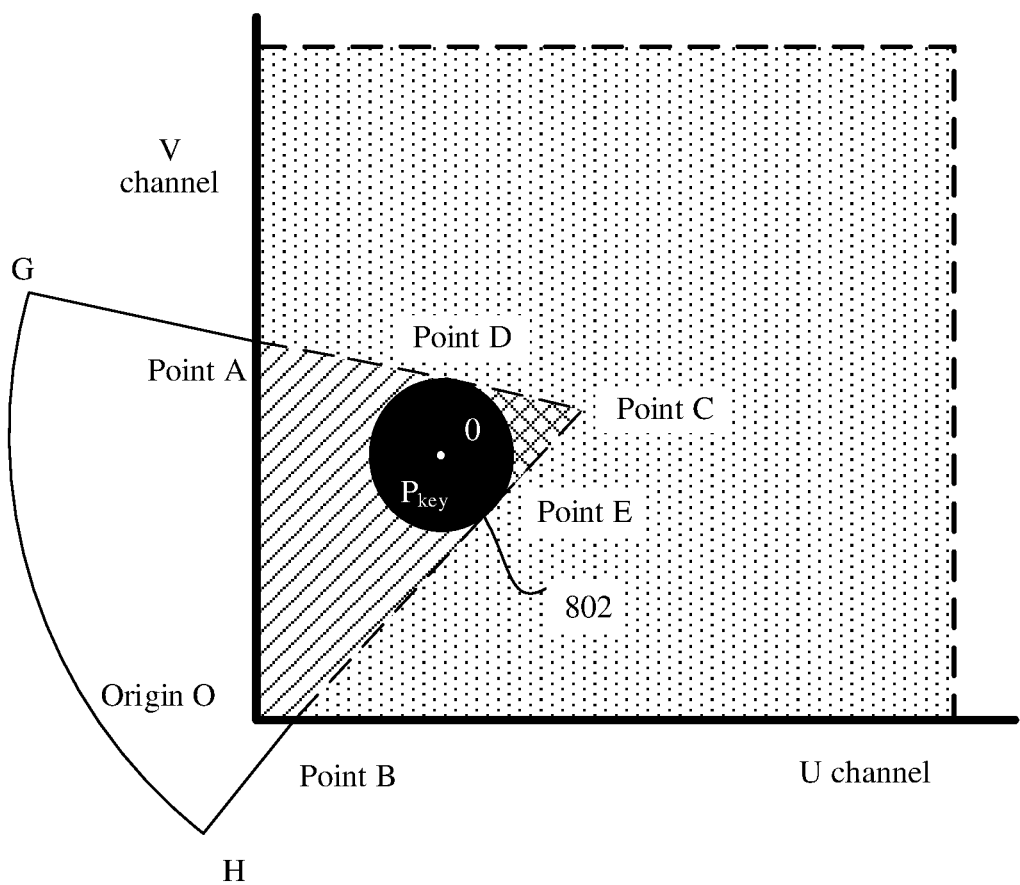
FIG. 8 is a schematic diagram of a mapping region corresponding to a color gamut of a target color category according to certain embodiment(s) of the present disclosure.

By way of example, FIG. 8 shows a schematic diagram of a mapping region in a first reference image corresponding to a color gamut of a target color category according to an embodiment. In this embodiment, assuming that the project image is an image with a green screen as the background, the target color category is green. In FIG. 8, the region where the circle 802 is located is the mapping region corresponding to the desired background color rendering range, $P_{key}$ is taken as the center of a circle, and the line segments CG and CH are the boundaries of the mapping region in the first mapping image corresponding to the color gamut. The circle 802 is tangent to the line segment CG and line segment CH, respectively, and the tangent points are point D and point E, respectively. When the angle ACB (i.e., color gamut angle)

and the length of the line segment $cP_{key}$ are given, the radius of the circle (i.e., color rendering range value) may be calculated according to the formula (1); and when the angle ACB (i.e., color gamut angle) and the difference between the line segment $cP_{key}$ and the radius of the circle are given, the radius of the circle may be calculated according to the formula (2).

In the embodiment, the color rendering range value may be determined simply based on the color gamut angle inputted by the user and the target segment length, which omits the process of manually setting the color rendering range value for different background colors, simplifies the interaction process and improves the image processing efficiency.

In one embodiment, the operation of determining a center mapping location point corresponding to the desired background color rendering range on the first reference image based on the mapping location point corresponding to the preset chrominance component combination includes: acquire a first mapping location point corresponding to neutral gray; where the first mapping location point corresponding to neutral gray is obtained by mapping a chrominance component combination corresponding to the neutral gray to the first reference image; and the chrominance component combination corresponding to the neutral gray is obtained from chrominance components of the neutral gray in at least two chrominance channels; calculate a direction angle of a straight line defined by the mapping location point corresponding to the preset chrominance component combination and the first mapping location point corresponding to neutral gray as a target direction angle corresponding to a center mapping location; determine the center mapping location point in the first reference image based on the target direction angle and an acquired target segment length; where the target segment length is positively correlated with the size of a foreground color rendering range in a color gamut corresponding to the target color category.

A straight line defined by the mapping location point corresponding to the preset chrominance component combination and the first mapping location point corresponding to neutral gray refers to a unique straight line (if any) that passes through the mapping location point corresponding to a preset chrominance component combination and the first mapping location point corresponding to neutral gray. The direction angle refers to an included angle formed by the straight line and the vertical direction. The target direction angle corresponding to the center mapping location refers to a direction angle of the straight line passing through the center mapping location and the first mapping location point corresponding to neutral gray. The direction angle of the straight line passing through the mapping location point corresponding to the preset chrominance component combination and the first mapping location point corresponding to neutral gray is determined as the target direction angle corresponding to the center mapping location, which indicates that the center mapping location and the mapping location point corresponding to the preset chrominance component combination are on the same straight line. Therefore, in this embodiment, the direction of the center mapping location point is actually determined through the preset chrominance component combination. The color gamut corresponding to the target color category refers to the color gamut of the target color category in the target color space, and reference may be made to the detailed description in the embodiment.

In certain embodiment(s), in this embodiment, by establishing a system in the first reference image with two chrominance channels as the Y-axis and the X-axis, and one of the vertices as the origin, coordinates of the center mapping location point may be calculated based on the lengths of mapping line segments of $cP_{key}$ on the X-axis and Y-axis and the coordinates of the first mapping location point corresponding to the neutral gray, so that the center mapping location point in the first reference image may be determined.

For example, still referring to FIG. 8, assuming that both the width and height of the first reference image shown in FIG. 8 are g (g represents a gray scale), the coordinates of the first mapping location point corresponding to the neutral gray is (g/2, g/2). When the acquired target segment length is $cP_{key}$, the center mapping location point $P_{key}$ may be calculated according to the following formula (3), where β represents the direction angle:

$$\text{Coordinates of } p_{key} = \left(\frac{g}{2} - dg\cos\beta, \frac{g}{2} - dg\sin\beta\right) \quad (3)$$

If the acquired target segment length is equal to the difference between the CP and the radius of the circle, the center mapping location point $P_{key}$ may be calculated according to the following formula (4), where β represents the direction angle:

$$\text{Coordinates of } p_{key} = \left(\frac{g}{2} - (d+r)g\cos\beta, \frac{g}{2} - (d+r)g\sin\beta\right) \quad (4)$$

In the embodiment, the target direction angle corresponding to the center mapping location point is defined by the mapping location point corresponding to the preset chrominance component combination, so that the center mapping location point in the first reference image may be determined based on the target direction angle and the acquired target segment length. Compared with the center mapping location directly determined from the mapping location point corresponding to the preset chrominance component combination, the center mapping location point determined in this embodiment is more accurate. Moreover, the center mapping location point is acquired by adopting default parameters, which simplifies the interaction process during image processing and improves the image processing efficiency.

In one embodiment, the operation of determining the first target region on the first reference image based on the center mapping location point and the color rendering range value includes: establish a first polar coordinate system with the center mapping location point as a pole and the color rendering range value as a polar radius; determine a first tangent point and a second tangent point formed by a first target circle and a target tangent based on the first polar coordinate system; where regarding the first target circle, the center mapping location point is taken as a center of a circle, and the color rendering range value is taken as a radius; and the target tangent is a straight line that passes through the first mapping location point corresponding to neutral gray and is tangent to the first target circle; determine, based on the first polar coordinate system, at least one first in-between location point on a first inferior arc on the first target circle formed with the first tangent point and the second tangent point as endpoints; take a line segment formed by the first tangent point, the second tangent point and the at least one first in-between location point as a first target broken line segment; and determine, from a mapping region on the first reference image corresponding to the color gamut of the target color category, a region away from the first mapping location point corresponding to neutral gray and bounded by the first target broken line segment as the first target region.

It is to be understood that, in the captured image to be processed with the screen of the target color category as the background, due to the influence of shooting angles, light and other factors, there may be highly saturated candidate colors in the project image. In the color gamut corresponding to the target color category, the region with high saturation is away from neutral gray. Considering that if only the mapping region corresponding to the desired background color rendering range is taken as the first target region, it is likely that the first target region does not include the mapping location points corresponding to the highly saturated candidate colors, resulting in failure to effectively process regions with highly saturated candidate colors when the background of the project image is processed. Therefore, in order to improve the accuracy of image processing, it is desirable to expand the first target region, so that the first target region may include mapping location points corresponding to highly saturated candidate colors as much as possible. Referring to FIG. 8, the sector CGH is the mapping region corresponding to the color gamut of the target color category, and point C is the mapping location point corresponding to neutral gray. As may be seen from the distribution features of colors in the target color space, the region where the circle is located is the region with normal saturation, the region formed by inferior arc DE and point C is the region with low saturation, and the region formed by inferior arc GH, superior arc DE, line segment DG and line segment EH is the region with high saturation. Therefore, in the embodiments of the present disclosure, the region DEHG may be included in the first target region.

In certain embodiment(s), the inferior arc may be acquired by determining an approximate broken line segment (i.e., first target broken line segment) of inferior arc DE, and from a mapping region on the first reference image corresponding to the color gamut of the target color category, a region away from the first mapping location point corresponding to neutral gray and bounded by the first target broken line segment is determined as the first target region.

In one embodiment, n points at equal intervals may be found on the inferior arc DE, and the broken lines formed by these points are used for approximating the inferior arc, where n may be set as needed, and the proposed value of n is 10. Taking FIG. 8 as an example, point D is the first tangent point, point E is the second tangent point, and the lines CD and CE are two target tangents, respectively. The steps for determining the first target broken line segment are as follows:

1) The first polar coordinate system is established with $P_{key}$ as the center of a circle, and the polar radius as the radius r of the circle.
2) For an nth point (that is, point D) on the first target broken line segment under the polar coordinate system, the angle of point D is $$\beta + \pi + \left(\frac{\pi}{2} - \frac{\theta}{2}\right),$$

where the circle described herein refers to the circle with $P_{key}$ as the radius, such as the circle 802 in FIG. 8.

3) For a first point (that is, point E) on the first target broken line segment under the polar coordinate system, the angle is $$\beta + \pi - \left(\frac{\pi}{2} - \frac{\theta}{2}\right).$$

4) For an $i^{th}$ point between the nth point and the first point (that is, the first in-between location point), the angle is $$\beta + \pi - \left(\frac{\pi}{2} - \frac{\theta}{2}\right) + ig\frac{\pi - \theta}{n - 1}.$$

5) The points obtained are connected in turn to obtain the first target broken line segment, which may be approximate to the inferior arc DE.

In the embodiment, after the establishment of the first polar coordinate system, the first tangent point, the second tangent point and at least one in-between location point may be defined by the first polar coordinate system, so that the first broken line segment may be quickly obtained, thus determining the location of the first target region.

In one embodiment, the method further includes: establish a second polar coordinate system with the center mapping location point as a pole and a target value as a polar radius; determine a first extended location point based on the second polar coordinate system; where the first extended location point is on the same line with the first tangent point and the first mapping location point corresponding to neutral gray, and is away from the first mapping location point corresponding to neutral gray; determine a second extended location point based on the second polar coordinate system; where the second extended location point is on the same line with the second tangent point and the first mapping location point corresponding to neutral gray, and is away from the first mapping location point corresponding to neutral gray; determine, based on the second polar coordinate system, at least one second in-between location point on a second inferior arc on the second target circle formed with the first extended location point and the second extended location point as endpoints; where regarding the second target circle, the first mapping location point corresponding to neutral gray is taken as a center of a circle, and the target value is taken as a radius; take a line segment defined by the first extended location point, the second extended location point and the at least one second in-between location point as a second target broken line segment; determine, from the first reference image, a region defined by the second target broken line segment, a first connecting line segment and a second connecting line segment as a mapping region corresponding to a color gamut of the target color category; where the first connecting line segment is a connecting line between the first mapping location point corresponding to neutral gray and the first extended location point; and the second connecting line segment is a connecting line between the first mapping location point corresponding to neutral gray and the second extended location point.

The target value is larger than the length of the line segment between the first mapping location point corresponding to neutral gray and the vertex of the first reference image. For example, as shown in FIG. 8, the target value is often required to be greater than the length of the line segment OC.

In certain embodiment(s), after establishing a second polar coordinate system with the center mapping location point as the pole and the target value as the polar radius, the server may determine a first extended location point and a second extended location point based on the polar coordinate system, wherein the first extended location point is on the same line with the first tangent point and the first mapping location point corresponding to neutral gray, and is away from the first mapping location point corresponding to neutral gray; the second extended location point is on the same line with the second tangent point and the first mapping location point corresponding to neutral gray, and is away from the first mapping location point corresponding to neutral gray. For example, as shown in FIG. 8, the first extended location point is the point G, and the second extended location point is the point H.

Further, the server, based on the second polar coordinate system, determines at least one second in-between location point on an inferior arc on the second target circle formed with first extended location point and the second extended location point as endpoints. The second target broken line segment may be obtained by connecting these location points in turn starting from the first extended location point. The second target circle is a circle with the first mapping location point corresponding to neutral gray as the center of a circle and the target value as the radius. Referring to FIG. 8, the second target circle is a circle with point C as the center of a circle and the length of the line segment CG as the radius, and the inferior arc with the first extended location point and the second extended location point as the end points refers to the inferior arc GH. The second target broken line segment may be approximate to the inferior arc GH. The first extended location point, the second extended location point and the second in-between location point may be calculated with reference to the steps of calculating the first tangent point, the second tangent point and the first in-between location point, and details are not repeated herein.

The server may connect the first mapping location point corresponding to neutral gray and the first extended location point to obtain the first connecting line segment, and connect the first mapping location point corresponding to neutral gray and the second extended location point to obtain the second connecting line segment; and determine, from the first reference image, a region defined by the second target broken line segment, a first connecting line segment and a second connecting line segment as a mapping region corresponding to a color gamut of the target color category. Referring to FIG. 8, the region of the sector CGH is a mapping region corresponding to a color gamut of the target color category.

Figure 9:
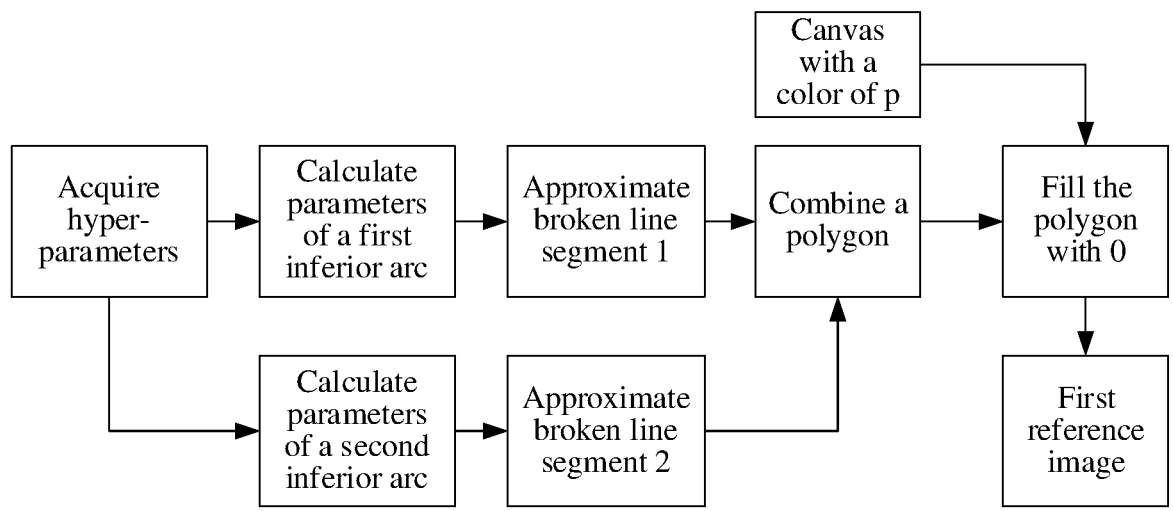
FIG. 9 is a schematic flowchart of generating a first reference image according to certain embodiment(s) of the present disclosure.

In certain embodiment(s), FIG. 9 shows a schematic flowchart of generating a first reference image according to an embodiment. In this embodiment, a canvas with a color of p may be acquired, and the steps for generating a first reference image on the canvas are as follows: Firstly acquire hyper-parameters such as an included angle θ formed by the angle ACB, the difference d between the line segment $cP_{key}$ and the radius of the radius, and the gray scale g (that is, the width and height of an image) as shown in, e.g., FIG. 8; calculate parameters of the first inferior arc, including the first tangent point, the second tangent point and at least one first in-between location point, acquire an approximate broken line segment 1 (i.e., the first target broken line segment) of the first inferior arc from the first tangent point, the second tangent point and at least one first in-between location point, that is, determine the point D, point E and at least one location point between the point D and point E on the first inferior arc DE, and acquire the approximate broken line segment of the first inferior arc DE according to these points, as shown in FIG. 8; calculate parameters of the second inferior arc, including the first extended location point, the second extended location point and at least one second in-between location point, acquire an approximate broken line segment 2 (i.e., the second target broken line segment) of the second inferior arc from the first extended location point, the second extended location point and at least one second in-between location point, that is, determine the point G, point H and at least one location point between the point G and point H on the second inferior arc GH, and acquire the approximate broken line segment 2 of the second inferior arc GH according to these points, as shown in FIG. 8; acquire a combined polygon according to the approximate broken line segment 1 and the approximate broken line segment 2, and the resulting polygons are inferior arc DE, line segment DG, inferior arc GH and line segment HE, as shown in FIG. 8. After the region of the polygon is determined on the canvas with a color of P, the polygon may be filled with a gray value of 0 to acquire the first reference image. It is to be understood that the gray value outside the polygon is P, i.e., 255.

Further, the preset gradient intensity a may be acquired as a hyper-parameter with an interval of [0,1]. On the basis of the polygon drawn on the canvas, fuzzy processing with a size of a·P is conducted, where fuzzy processing may be any one of mean fuzzy processing, Gaussian fuzzy processing, circular convolution kernel-based fuzzy processing; and the acquired first reference image, when used for matting, may ensure smooth transition for the transparency characterization value calculated in the translucent region.

In one embodiment, the method further includes: configure different location point-based gray values for the first target region and a non-target region in the first reference image, and establish a correspondence between the location point-based gray values and processing eigenvalues; determine a target processing feature corresponding to the pixel point according to a pixel feature of the first mapping location point in the first reference image, which includes: based on the correspondence between the location point-based gray values and the processing eigenvalues, acquiring a processing eigenvalue corresponding to a location point-based gray value of the first mapping location point as a target processing feature corresponding to the pixel point.

The gray value of a location point refers to the gray value of a pixel location. The non-target region refers to a region other than the first target region in the first reference image.

In certain embodiment(s), in this embodiment, after determining the first target region, the server may fill pixels in the first target region with a first gray value and the non-target region with a second gray value different from the first gray value; and establish a correspondence between the first gray value and a first processing eigenvalue, as well as a correspondence between the second gray value and a second processing eigenvalue different from the first processing eigenvalue. With a correspondence established between the location point-based gray value and the processing eigenvalue, after acquiring the first mapping location point corresponding to the pixel point in the project image, the server may acquire the processing eigenvalue corresponding to the location point-based gray value according to the location point-based gray value of the first mapping location point in the first reference image, and determine the acquired processing eigenvalue as the target processing feature corresponding to the pixel point. Thus, the target processing feature may be quickly determined based on the pre-established correspondence.

In the embodiment, since the correspondence between the mapping location point and the processing eigenvalue is established in advance according to the location relation between the mapping location point and the first target region, the acquired first reference image has improved ease of use; and during image processing for the project image, the target processing feature of a pixel point may be quickly acquired, which improves the image processing efficiency.

In one embodiment, the background of the project image includes an image region belonging to the target color category. The operation of processing the project image based on the target processing feature of each of the pixel points includes: in response to that the target processing feature is a transparency characterization value, and a correspondence is present between the location point-based gray value corresponding to the first target region and a first transparency characterization value, and between the location point-based gray value corresponding to the non-target region and a second transparency characterization value, configure a transparency characterization value for each of the pixel points in the project image to remove a target image region from the project image; where the first transparency characterization value is used for shielding a corresponding pixel point in the project image; and the second transparency characterization value is used for displaying a corresponding pixel point in the project image.

In certain embodiment(s), in this embodiment, the target processing feature is a transparency characterization value, and a correspondence is present between the location point-based gray value corresponding to the first target region and a first transparency characterization value, and between the location point-based gray value corresponding to the non-target region and a second transparency characterization value different from the first transparency characterization value, where the first transparency characterization value represents transparency, and is used for shielding the corresponding pixel point in the project image, that is, after the transparency characterization value of the pixel point is set to the first transparency characterization value, the pixel point is no longer displayed in the image; and the second transparency characterization value represents non-transparency, and is used for displaying the corresponding pixel point in the project image, that is, after the transparency characterization value of the pixel point is set to the second transparency characterization value, the pixel point may be displayed normally in the image.

The background of the project image includes an image region belonging to the target color category, for example, the project image may be an image captured with a screen of the target color category as the background. In this embodiment, by setting the first target region to characterize transparency and the non-target region to characterize non-transparency, during image processing, for each of pixel points in the project image, the transparency characterization value corresponding to the location point-based gray value may be acquired according to the location point-based gray value of the first mapping location point of the pixel point in the first reference image; the acquired transparency characterization value is determined as the transparency characterization value corresponding to the pixel point, and each pixel point in the project image is configured with the corresponding transparency characterization value. For the image region belonging to the target color category, the pixel points are transparent and shielded, while for the image region that does not belong to the target color category, the pixel points are displayed normally, so as to remove the target image region from the project image, that is, achieve matting.

In the embodiment, by setting the first target region to characterize transparency and the non-target region to characterize non-transparency, the transparency characterization value of a pixel point may be quickly determined by querying the first reference image, so that the target image region may be quickly removed from the project image.

In one embodiment, the operation of configuring different location point-based gray values for the first target region and a non-target region in the first reference image, and establishing a correspondence between the location point-based gray values and processing eigenvalues includes: configure a minimum gray value for the first target region in the first reference image; configure a maximum gray value for the non-target region in the first reference image; acquire a preset gradient intensity parameter, and conduct fuzzy processing on the first reference image based on the gradient intensity parameter to acquire an updated first reference image; establish a correspondence between a gray value of each of pixel points in the updated first reference image and a transparency characterization value of the same value.

The minimum gray value refers to the gray value with the lowest gray scale, and the maximum gray value refers to the gray value with the highest gray scale. The minimum gray value may be 0, and the maximum gray value may be 255.

In certain embodiment(s), After acquiring a preset gradient intensity parameter, the server may conduct fuzzy processing on the first reference image based on the gradient intensity parameter to acquire an updated first reference image, where the updated first reference image includes a gray value greater than the minimum gray value and smaller than the maximum gray value; the server further establishes a correspondence between a gray value of each of pixel points in the updated first reference image and a transparency characterization value of the same value, that is, the value of the gray value is exactly that of the transparency characterization value. For example, if the gray value is 25, the transparency characterization value is 25.

In one embodiment, the transparency characterization value is positively correlated with the transparency of the pixel point, that is, the greater the transparency characterization value, the higher the pixel transparency. When the transparency characterization value reaches the maximum, the pixel point is transparent, that is, the pixel point is shielded in the image to the maximum extent, and its color is no longer displayed in the image; and when the transparency characterization value reaches the minimum, the pixel point is non-transparent, that is, the color of the pixel point may be displayed in the image to the maximum extent. The transparency characterization value may be transparency. The server may establish a correspondence between the maximum gray value and the maximum transparency characterization value by establishing a correspondence between a gray value of each of pixel points in the updated first reference image and a transparency characterization value of the same value, so that the gray value of 255 may be used for representing transparency. In the meanwhile, the server establishes a correspondence between the minimum gray value and the second transparency characterization value, so that the gray value of 0 may be used for representing non-transparency. At this time, for the in-between gray value which is greater than the minimum gray value and less than the maximum gray value, the greater the gray value, the higher the degree to which the pixel point is shielded by the corresponding transparency characterization value.

In another embodiment, the transparency characterization value is negatively correlated with the transparency of the pixel point, that is, the greater the transparency characterization value, the lower the pixel transparency. When the transparency characterization value reaches the maximum, the pixel point is non-transparent, that is, the pixel point may be displayed in the image to the maximum extent; and when the transparency characterization value reaches the minimum, the pixel point is transparent, that is, the pixel point is shielded in the image to the maximum extent, and its color is no longer displayed in the image. The transparency characterization value may be non-transparency. The server may establish a correspondence between the maximum gray value and the maximum transparency characterization value by establishing a correspondence between a gray value of each of pixel points in the updated first reference image and a transparency characterization value of the same value, so that the gray value of 255 may be used for representing non-transparency. In the meanwhile, the server establishes a correspondence between the minimum gray value and the minimum transparency characterization value, so that the gray value of 0 may be used for representing transparency. At this time, for the in-between gray value which is greater than the minimum gray value and less than the maximum gray value, the greater the gray value, the lower the degree to which the pixel point is shielded by the corresponding transparency characterization value.

In the embodiment, after the first reference image is updated by image processing, the correspondence between the gray value of each of pixel points in the updated image and the transparency characterization value of the same value is established, so as to achieve smooth transition for the transparency characterization value calculated in the translucent region, thus obtaining the matting quality featured by smooth edges.

In one embodiment, the method further includes: configuring different location point-based gray values for the first target region and a non-target region in the first reference image; and determine a target processing feature corresponding to the pixel point according to a pixel feature of the first mapping location point in the first reference image, which includes: determine the target processing feature corresponding to the pixel point as a first processing feature in response to that a location point-based gray value of the first mapping location point in the first reference image matches a location point-based gray value of the first target region; and determine the target processing feature corresponding to the pixel point as a second processing feature different from the first processing feature in response to that a location point-based gray value of first mapping location point in first reference image matches a location point-based gray value of non-target region.

In certain embodiment(s), the server configures different location point-based gray values for the first target region and a non-target region in the first reference image, that is, correlates the first target region and the gray values. For example, the location point-based gray value of the first target region may be set to 0 and the location point-based gray value of the non-target region may be set to 255, so as to determine whether a location point is located in the first target region or non-target region according to the location point-based gray value. After acquiring the first mapping location point corresponding to each of pixel points in the project image, whether the gray value of the first mapping location point matches the gray value of the first target region may be determined. If so, it indicates that the first mapping location point is in the first target region, and the target processing feature corresponding to the pixel point is the first processing feature; and if not, it indicates that the first mapping location point is outside the first target region, that is, it is in the non-target region, and the target processing feature corresponding to the pixel point is taken as a second processing feature different from the first processing feature, where the first processing feature is used for representing transparency, and the second processing feature is used for representing non-transparency.

In the embodiment, by configuring different location point gray values for the first target region and the non-target region, the location relation between the first mapping location point and the first target region may be determined by matching between the location point gray values. In this way, the corresponding processing eigenvalues may be determined based on the location relation, which omits the process of determining the location relation through complex calculation, and at the same time improves the image processing efficiency.

Figure 10:
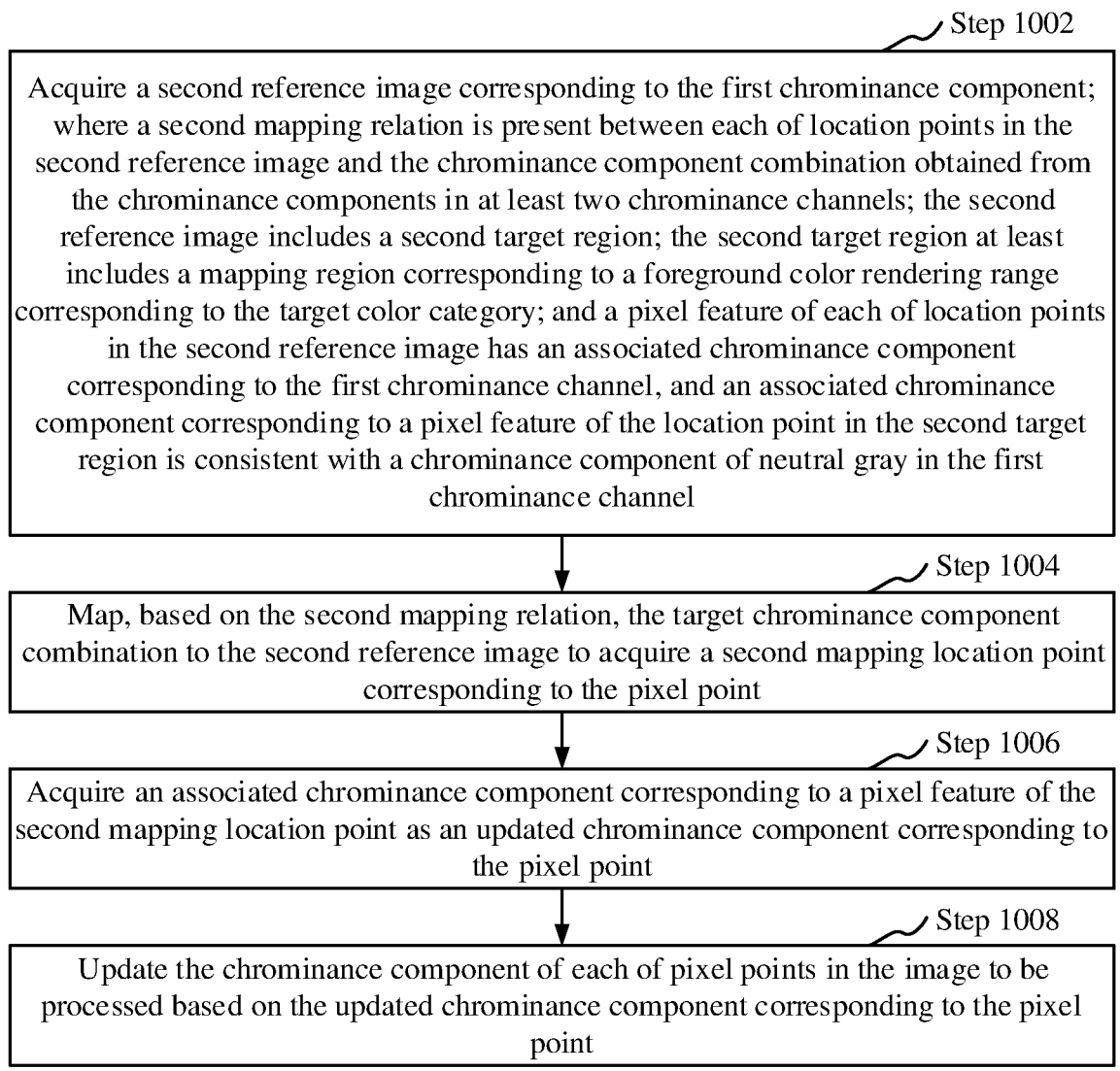
FIG. 10 is a schematic diagram of a process of updating a chrominance component of a pixel point according to certain embodiment(s) of the present disclosure.

In one embodiment, the method further includes: For each of pixel points in the project image, update the chrominance component of the pixel point in each corresponding chrominance channel by using the second reference image corresponding to the chrominance channel. Referring to FIG. 10, taking one of the chrominance channels (hereinafter referred to as the first chrominance component) as an example, the steps of updating the respective chrominance components of each pixel point under the chrominance channel are as follows:

Step 1002: Acquire a second reference image corresponding to the first chrominance component; where a second mapping relation is present between each of location points in the second reference image and the chrominance component combination obtained from the chrominance components in at least two chrominance channels; the second reference image includes a second target region; the second target region includes at least a mapping region corresponding to a foreground color rendering range corresponding to the target color category; and a pixel feature of each of location points in the second reference image has an associated chrominance component corresponding to the first chrominance channel, and an associated chrominance component corresponding to a pixel feature of the location point in the second target region is consistent with a chrominance component of neutral gray in the first chrominance channel.

The second reference image may be pre-generated and saved on the server for correcting the pixel values in the image as a reference. The second mapping relation indicates that for each location point in the second reference image, there is a corresponding chrominance component combination, and the chrominance component combination may vary depending on different location points. The second mapping relation and the first mapping relation may be the same mapping relation, the second reference image includes a second target region; the second target region includes at least a mapping region corresponding to a foreground color rendering range corresponding to the target color category; the foreground color rendering range corresponding to the target color category refers to the foreground color rendering range of the color gamut of the target color category in the target color space; while the mapping region corresponding to the foreground color rendering range refers to the region where the mapping location points corresponding to candidate colors within the foreground color range are distributed in the second reference image. Taking FIG. 8 as an example, assuming that FIG. 8 is a second reference image, the mapping region corresponding to the foreground color rendering range is the region enclosed by an inferior arc DE, a line segment CD and a line segment CE.

There is an associated chrominance component corresponding to the first chrominance channel in the pixel feature of each of the location points in the second reference image. That is, in this embodiment, an association relation between the pixel feature of each location point in the second reference image and the chrominance component under the first chrominance channel is established in advance, so that the associated chrominance component is the chrominance component under the first chrominance channel which is associated with the location point in the second reference image. Given that the associated chrominance component corresponding to the pixel feature of the location point belonging to the second target region is consistent with the chrominance component of neutral gray in the first chrominance channel, when the image is updated according to the chrominance component obtained from the pixel feature of the location point of the second target region, the updated pixel points in the project image may be rendered to neutral gray. The pixel feature may be a pixel location or a gray value.

In certain embodiment(s), the server acquires a second reference image corresponding to the first chrominance channel from the pre-stored reference image.

Step 1004: Map, based on the second mapping relation, the target chrominance component combination to the second reference image to acquire a second mapping location point corresponding to the pixel point.

Step 1006: Acquire an associated chrominance component corresponding to a pixel feature of the second mapping location point as an updated chrominance component corresponding to the pixel point.

In certain embodiment(s), since an association relation between the pixel feature and the chrominance component is established in advance, the associated chrominance component associated with the pixel feature of the second mapping location point may be queried based on the association relation; and an updated chrominance component corresponding to the pixel point is determined with the queried associated chrominance component. The updated chrominance component corresponding to each pixel point in the project image may be acquired by query.

Step 1008: Update the chrominance component of each of pixel points in the project image based on the updated chrominance component corresponding to the pixel point.

In certain embodiment(s), after acquiring the updated chrominance component of each pixel point in the first chrominance channel, the server may update the chrominance component of each pixel point in the first chrominance channel in the project image.

It is to be understood that, regarding each chrominance channel, the chrominance components of each pixel point in the project image in the chrominance channel are updated according to the steps; and for the updated image, the candidate colors corresponding to the foreground color rendering range are updated to neutral gray. For example, assuming that the project image is an image captured by someone under the green screen, hair and edges of clothing in the project image are rendered to grayish green with low saturation under the reflection of the green screen; and after processing through the steps of this embodiment, the grayish green changes to gray, so that the processed image may be more natural.

In the embodiment, by acquiring a second reference image in each chrominance channel, the color in the project image may be updated, so that the color presented in the foreground of the updated image is more natural.

In one embodiment, the method further includes: determine, from the second reference image, a mapping region corresponding to a color gamut of the target color category, and determine a region close to a second mapping location point corresponding to neutral gray and bounded by a first target broken line segment as the second target region; fill each of the location points in the second target region with a gray value matching a chrominance component of the neutral gray in the chrominance channel; and fill each of the location points outside the second target region with a gray value matching a corresponding mapping chrominance component on the chrominance channel; and the operation of acquiring an associated chrominance component corresponding to a pixel feature of the second mapping location point includes: acquire a chrominance component on the chrominance channel matching a gray value of the second mapping location point in the second reference image to acquire an associated chrominance component.

The second mapping location point corresponding to neutral gray refers to a mapping location point obtained by mapping a chrominance component combination corresponding to neutral gray to the second reference image based on the second mapping relation. The first target broken line segment may be determined with reference to the steps in the embodiment, and details are not repeated in the present disclosure. The mapping chrominance component of a location point on a chrominance channel refers to the value corresponding to the chrominance channel in a chrominance component combination that has a second mapping relation with the location point.

In certain embodiment(s), after determining the second target region, the server fills each of the location points in the second target region with a gray value matching a chrominance component of the neutral gray in the chrominance channel; and fill each of the location points outside the second target region with a gray value matching a corresponding mapping chrominance component on the chrominance channel. Since the filled gray value matches the chrominance component, the correlation between the chrominance component and the gray value is established by numerical matching. That is, the value of the gray value is exactly that of the corresponding associated chrominance component. For example, when the gray value is 30, the corresponding associated chrominance component is also 30. Take the second reference image of the U channel as an example, the second target region is filled with a gray value corresponding to neutral gray. For example, regarding an 8-bit image, the gray value may be 127. For a location point outside the second target region, a U channel value in a chrominance component combination having a first mapping relation with the location point is acquired. Assuming that the acquired U channel value is x1, the location point is filled with a gray value of x1.

An association relation between the chrominance component and the gray value is established by numerical matching, so that when it is desirable to acquire the associated chrominance component corresponding to the pixel feature of the second mapping location point, the server may directly query the gray value of the second mapping location point in the second reference image, and the gray value queried is exactly the associated chrominance component. For example, when a gray value of 127 is queried, the associated chrominance component is also 127.

In the embodiment, the association relation between the chrominance component and the gray value is established by numerical matching, so that the associated chrominance component may be quickly acquired by querying the gray value of the second mapping location point in the second reference image, which improves the image processing efficiency.

It is to be understood that, although the steps in the flowchart covered in each embodiment are shown in sequence as indicated by the arrows, these steps are not necessarily performed in sequence as indicated by the arrows. Unless otherwise explicitly specified in the present disclosure, execution of the steps is not strictly limited in sequence, and the steps may be performed in other sequences. Moreover, at least some of the steps in the flowchart covered in each embodiment may include a plurality of sub-steps or a plurality of stages. The sub-steps or stages are not necessarily performed at the same moment but may be performed at different moments. Execution of the sub-steps or stages is not necessarily sequentially performed, but may be performed alternately with other steps or at least some of sub-steps or stages of other steps.

The present disclosure also provides an implementation scenario which may be applied to the image processing method. In the implementation scenario, the green screen matting may be realized by using the image processing method provided in the embodiments of the present disclosure. That is, background matting is conducted on the project image captured with the green screen as the background to acquire foreground images. It is to be understood that, the color of the screen in the project image varies from different lighting, screens made of different materials and different camera shooting parameters. It is also to be understood that, in the process of capturing the project image, the curtain may also have other colors, such as blue. In this embodiment, the green screen is taken as an example.

Figure 11:
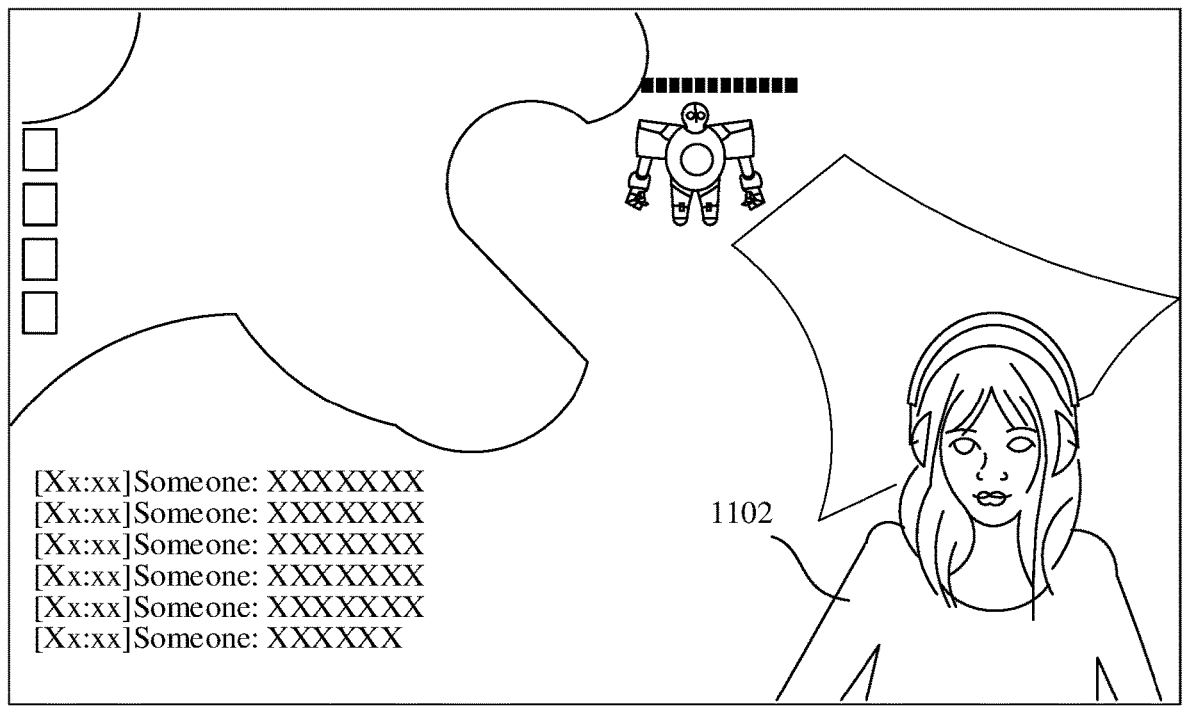
FIG. 11 is a schematic diagram illustrating the implementation of green screen-based matting according to certain embodiment(s) of the present disclosure.

Green screen matting helps to achieve the image effect shown in FIG. 11 during live streaming/watching under the accompany of stars, thus brining better appearance quality. The target character 1102 shown in FIG. 11 is the foreground image obtained by green screen matting.

Figure 12:
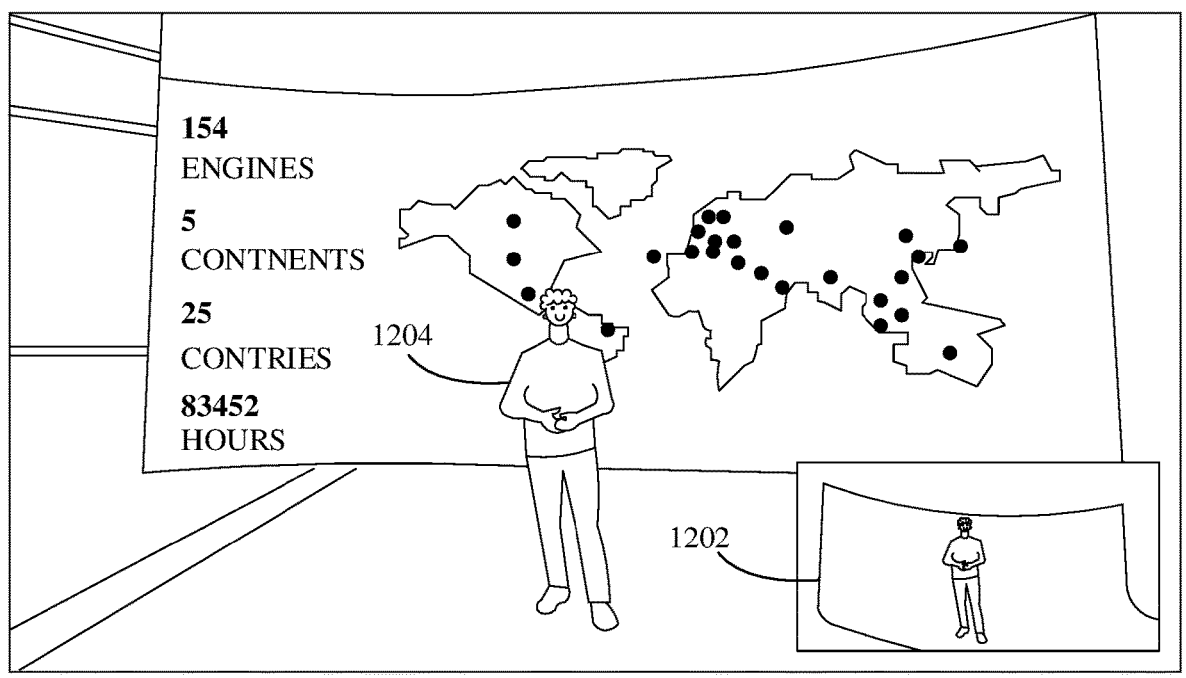
FIG. 12 is a schematic diagram illustrating the implementation of green screen-based matting according to certain embodiment(s) of the present disclosure.

Through green screen matting, virtual film production may also be realized. Virtual film production is a technology that mixes real characters with virtual scenes. With virtual production technology, variety shows and large-scale live streaming activities may achieve fantastic and flexible image effects, thus brings the user an ultimate experience in special effects of live streaming/on-demand activities. FIG. 12 is a schematic diagram of the effect of virtual production, where 1202 is a captured green screen image (image to be processed), and characters may be extracted from 1202 according to the image processing method provided in the embodiments of the present disclosure, so as to be applied to the variety image frame shown in FIG. 12, that is, 1204 in FIG. 12.

In implementation green screen matting, after the user sets the UV value of the background color, 3 reference images are quickly established by drawing, which are used for accelerating the matting speed. Among the three reference images, one is taken as a first reference image and two second are reference images, where for the first reference image, a transparency standard value is queried according to the UV value; and for the second reference image, the gray value of the updated U channel or V channel is queried according to the UV value. Steps are as follows:

First, establish a first reference image.

Obtain the canvas whose gray values are all g, and establish the first reference image with the lower left corner of the canvas as the origin, the U channel as the X-axis with and V channel as the Y-axis (refer to FIG. 8 for details) according to the following steps:

1. Configure hyper-parameters, which include: an included angle θ formed by the angle ACB, the difference d between the line segment $cP_{key}$ and the radius of a circle, the gray scale g (that is, the width and height of an image), gradient intensity a (where the circle is tangent to CA and CB, the tangent points are D and E respectively, and the included angle θ is acute).

2. Calculate a direction angle β of vector $cP_{key}$ according to the following formula (5), where v represents the gray value of the background color in the V channel, and u represents the gray value of the background color in the U channel:

$$\beta = a\tan2\left(v - \frac{g}{2}, u - \frac{g}{2}\right) \quad (5)$$

3. Draw an inferior arc DE, which includes:
1) Calculate the radius r of a circle according to the formula (2);
2) Calculate coordinates of the center of a circle $P_{key}$ according to the formula (4);
3) Establish a polar coordinate system using the center of a circle $P_{key}$ and the radius r, find n points at equal intervals on the inferior arc DE by using the polar coordinate system, and acquire an approximate inferior arc DE using the broken line composed of these points, where n may be 10. Reference may be made to the description of the embodiment for details.

4. Draw an inferior arc GH, where point G is on the half-line CA, point H is on the half-line CB, and the radius of the arc is desirably to be greater than the length of the line segment OC, i.e., $\sqrt{2}g$. Reference may be made to the description of the embodiment for details.

5. The approximate broken line of inferior arc GH, the approximate broken line segment of inferior arc DE, the line segment DG and the line segment EH are combined into the desired polygon shape.

6. On the canvas where the gray values are all g, draw the polygon with a gray value of 0 (that is, the first target region).

7. Add a gradient effect, and represent gradient intensity a as a hyper-parameter with an interval of [0,1], so as to ensure smooth transition for the transparency calculated in the translucent region. On the basis of the polygon drawn on the canvas, conduct fuzzy processing with the size of a·P.

In the first reference image, transparency is represented by a gray value of 0, and non-transparency is represented by a maximum gray value g (in a two-dimensional image, g is 255), so that a correspondence between a gray value and transparency which are numerically equal may be established, thus achieving background matting for the green screen of the project image.

Second, establish a second reference image. Considering that the hair and the edges of clothing may be rendered to grayish green with low saturation under the reflection of the green screen, referring to FIG. 8, the grayish green with low saturation is distributed in a region DCE defined by the inferior arc DE, line segment DC and line segment EC. In order to achieve a more natural matting effect, it is desirable to change grayish green to gray. As may be seen from the previous description, the corresponding colors of the polygonal region composed of inferior arc DE, line segment DA, line segment AO, line segment OB and line segment BE are removed, so the sector region GCH may be determined as the second target region.

1, Establish a second reference image corresponding to the U channel. The operation of determining the sector GCH region is the same as that of determining the first reference image, and reference may be made to the description of the previous embodiment.

1) Obtain the canvas whose gray values are all g, and take the lower left corner of the canvas as the origin, the U channel as the X-axis with and V channel as the Y-axis (refer to FIG. 8 for details).
2) Fill the canvas with a gradient color along the U-axis by filling the pixel points on line i (u-axis) and column j (v-axis) with the gray value of i.
3) Fill the sector region GCH with a color having a color gray value of g/2 (gray value corresponding to neutral gray).
4) Conduct fuzzy processing on the image acquired in step 3).

2, Establish a second reference image corresponding to the V channel. The operation of determining the sector GCH region is the same as that of determining the first reference image, and reference may be made to the description of the previous embodiment, which will not be repeated herein.

1) Obtain the canvas whose gray values are all g, and take the lower left corner of the canvas as the origin, the U channel as the X-axis with and V channel as the Y-axis (refer to FIG. 8 for details).
2) Fill the canvas with a gradient color along the V-axis by filling the pixel points on line i (u-axis) and column j (v-axis) with the gray value of j.
3) Fill the sector region GCH with a color having a color gray value of g/2 (gray value corresponding to neutral gray).
4) Conduct fuzzy processing on the image acquired in step 3).

By acquiring the second reference image corresponding to the U channel and the second reference image corresponding to the V channel, the colors corresponding to a region defined by the inferior arc DE, the line segment DC and the line segment EC may be mapped to neutral gray.

Third, conduct matting on the project image by using the first reference image, the second reference image corresponding to the U channel and the reference image corresponding to the V channel.

Figure 13:
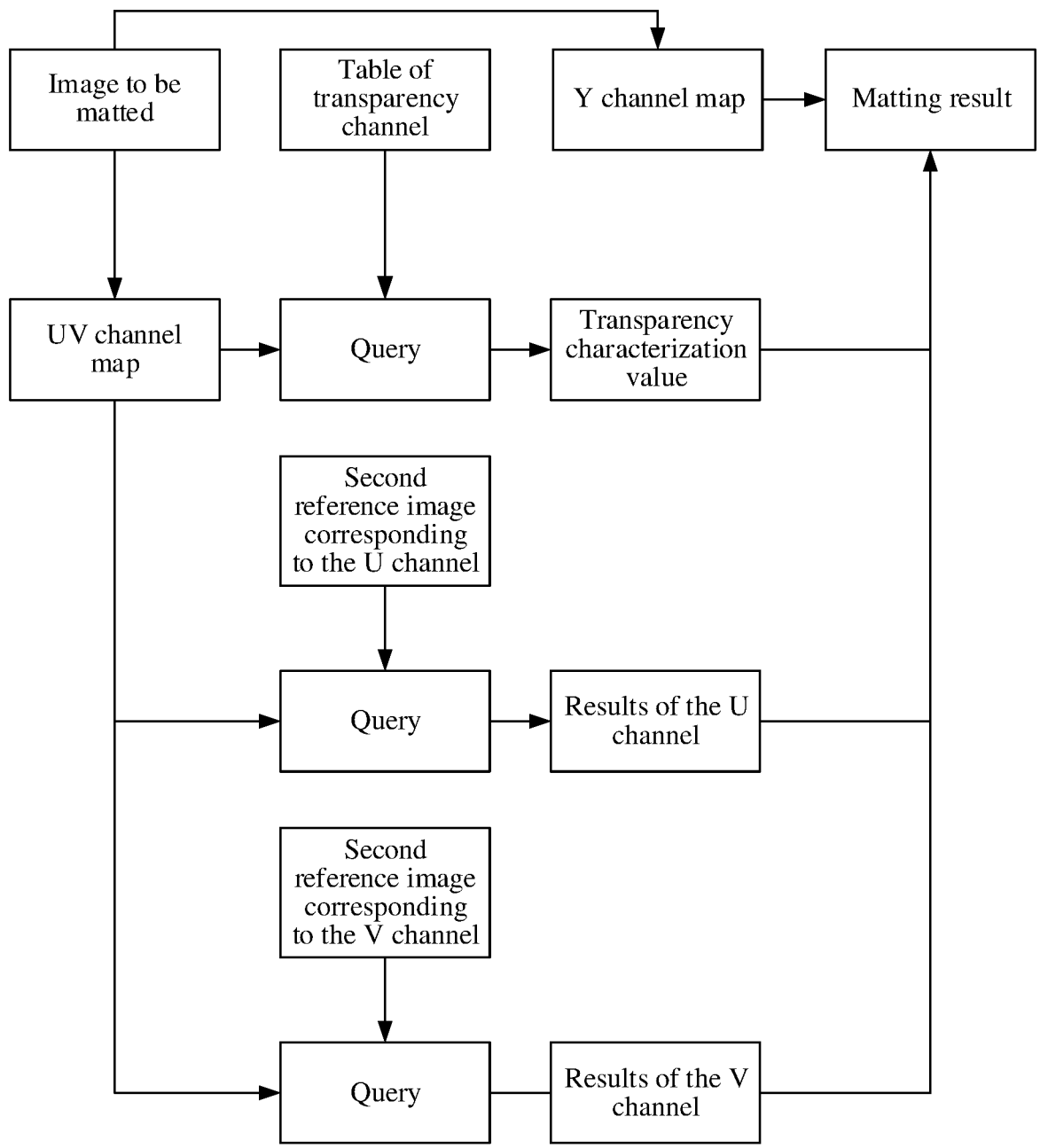
FIG. 13 is a schematic flowchart of matting according to certain embodiment(s) of the present disclosure.

FIG. 13 shows a schematic flowchart of matting, and steps in FIG. 13 are applied to a computing device. The computing device may be a terminal, or a server, or a system including a terminal and a server. The embodiment is described below by using an example of the server. The steps are as follows:

1. For an image to be matted (that is, the project image), acquire a UV channel map (including a U channel map and a V channel map) and a Y channel map.

2. Conduct query in combination with the first reference image to obtain transparency. In certain embodiment(s), for the UV value of each pixel location on the image to be matted (that is, the gray value of U channel and the gray value of V channel), take the gray value on line u, column v in the first reference image according to the correspondence between the gray value and transparency, where the gray value is exactly the transparency.

3. Conduct query in combination with the second reference image corresponding to the U channel to acquire a matting result corresponding to the U channel (the value of an updated U channel). In certain embodiment(s), for the UV value of each pixel location on the image to be matted, acquire the matting result corresponding to the U channel by taking the gray value in line u, column v in the second reference image corresponding to the U channel.

4. Conduct query in combination with the second reference image corresponding to the V channel to acquire a matting result corresponding to the V channel (the value of an updated U channel). In certain embodiment(s), for the UV value of each pixel location on the image to be matted, acquire the matting result corresponding to the V channel by taking the gray value in line u, column v in the second reference image corresponding to the V channel.

5. For each pixel location on the image to be matted, the transparency, the matting result corresponding to the U channel and the matting result corresponding to the V channel form the matting result of the position, which allows for matting of the green screen background from the image to be matted.

It is to be understood that, the hyper-parameters given in the implementation scenario are default parameters, and the user may acquire the first reference image and two second reference images to achieve normal matting using these default parameters without making any adjustment in the parameters, which greatly reduces the difficulty in use. In certain embodiment(s), if the user further adjusts these hyper-parameters, the quality of the matting edge may be further improved.

Figure 14:
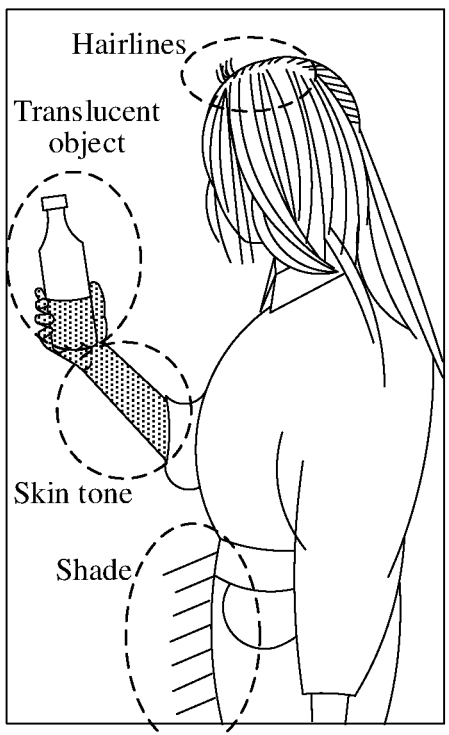
FIG. 14 is a schematic diagram comparing effects of matting according to certain embodiment(s) of the present disclosure.
Figure 14:
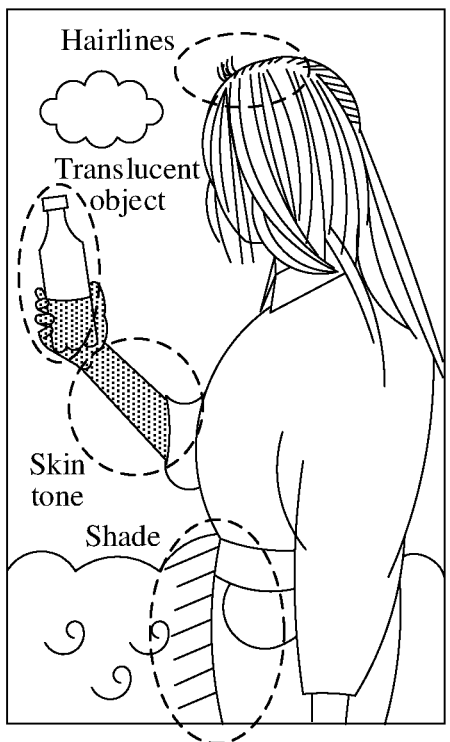
Figure 14:
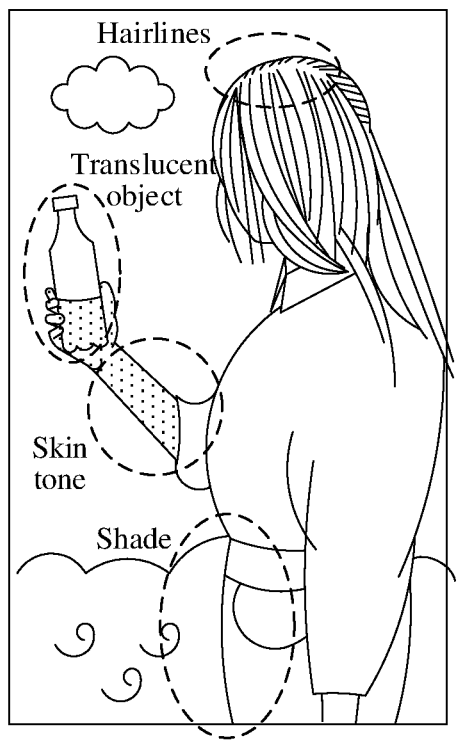

In the embodiment, a better matting effect may be achieved in practice by establishing the first reference image and two second reference images. Referring to FIG. 14, FIG. 14(a) shows an image to be matted under a green screen, and FIG. 14(b) shows a schematic diagram illustrating the operation conducting background matting on FIG. 14(a), and applying the acquired foreground image to other backgrounds using the method provided in the embodiments of the present disclosure. FIG. 14(c) is a schematic diagram illustrating the operation of conducting background matting on FIG. 14(a), and applying the acquired foreground image to other backgrounds using the method in certain existing technology. As may be seen from FIG. 14, the method provided in this embodiment of the present disclosure has the following advantages: 1. A more natural skin tone (close to the original skin tone) may be obtained. 2. The hairlines may be kept well. 3. The shade may be shown well. 4. Translucent objects may be shown well.

Based on the same inventive concept, an embodiment of the present disclosure also provides an image processing apparatus configured to implement the image processing method. Since the solution provided in the apparatus is similar to the solution recorded in the method, for the limitations in one or more embodiments of the image processing apparatus provided below, reference may be made to the limitations in the image processing method described above, and details are not described herein.

Figure 15:
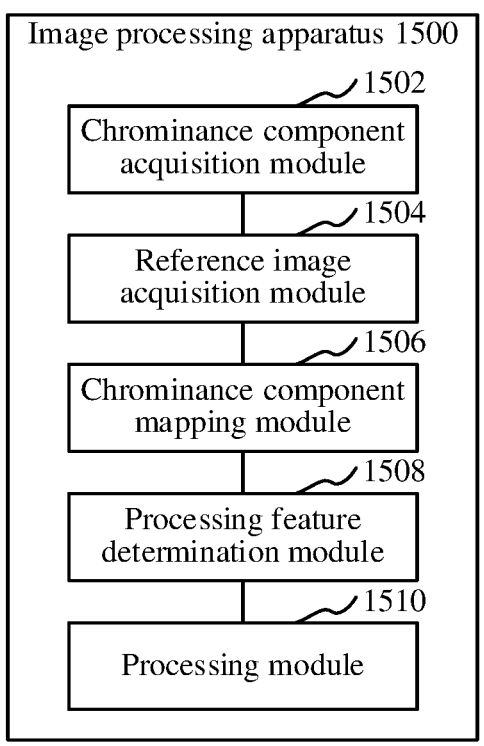
FIG. 15 is a structural block diagram of an image processing apparatus according to certain embodiment(s) of the present disclosure.

In one embodiment, as shown in FIG. 15, an image processing apparatus 1500 is provided, including:

a chrominance component acquisition module 1502 configured to acquire a project image, and acquire a target chrominance component combination corresponding to each of pixel points in the project image, where the target chrominance component combination is obtained from chrominance components of pixel point in at least two chrominance channels respectively;

a reference image acquisition module 1504 configured to acquire a first reference image; where a first mapping relation is present between each of location points in the first reference image and the chrominance component combination obtained from the chrominance components in at least two chrominance channels; the first reference image includes a first target region; the first target region is a region in which mapping location points corresponding to a target color category are distributed; the mapping location points corresponding to the target color category are obtained by mapping a candidate chrominance component combination of the target color category; and the candidate chrominance component combination is obtained from chrominance components of a candidate color of target color category in at least two chrominance channels, respectively;

a chrominance component mapping module 1506 configured to map, based on the first mapping relation, the target chrominance component combination to the first reference image to acquire a first mapping location point corresponding to the pixel point;

a processing feature determination module 1508 configured to determine a target processing feature corresponding to the pixel point according to a pixel feature of the first mapping location point in the first reference image; where the target processing feature matches a target location relation; and the target location relation characterizes a location relation between the first mapping location point and the first target region; and a processing module 1510 configured to process the project image based on the target processing feature of each of pixel points.

In the image processing device, after the project image is acquired, the target chrominance component combination corresponding to each of the pixel points in the project image is acquired, and the first reference image including the first target region is further acquired. Due to a first mapping relation between the location points in the first reference image and the chrominance component combination obtained from the chrominance components of at least two chrominance channels, the first mapping location point corresponding to the pixel point may be acquired by mapping the target chrominance component combination to the first reference image based on the first mapping relation. Since the first target region is the region where the mapping location points corresponding to the target color category are distributed, and the mapping location points corresponding to the target color category are acquired by mapping the candidate chrominance component combination of the target color category, the distribution features of the target color category in the color space defined by at least two chrominance components may be reflected, the target processing features that may be used for processing the image may be determined according to the location relation between the first mapping location point and the first target region, and the project image may be processed according to the target processing features, which not only omits the complex calculation process and tedious operation, but also improves image processing efficient.

In one embodiment, the image processing apparatus further includes: a first target region determining module configured to acquire a preset chrominance component combination, and map the preset chrominance component combination to the first reference image based on the first mapping relation to acquire a mapping location point corresponding to the preset chrominance component combination; acquire a color rendering range value corresponding to a desired background color rendering range of the target color category; where the color rendering range value is positively correlated with the size of the desired background color rendering range; determine a center mapping location point corresponding to the desired background color rendering range on the first reference image based on the mapping location point corresponding to the preset chrominance component combination; and determine the first target region on the first reference image based on the center mapping location point and the color rendering range value.

In one embodiment, the first target region determining module is further configured to: acquire an inputted color gamut angle and a target segment length; where the color gamut angle is positively correlated with the size of a color gamut of the target color category in a target color space; the target color space is a color space determined according to the at least two chrominance channels; and the target segment length is positively correlated with the size of a foreground color rendering range in the color gamut; and determine the color rendering range value based on the color gamut angle and the target segment length.

In one embodiment, the first target region determining module is further configured to: acquire a first mapping location point corresponding to neutral gray; where the first mapping location point corresponding to neutral gray is obtained by mapping a chrominance component combination corresponding to the neutral gray to the first reference image; and the chrominance component combination corresponding to the neutral gray is obtained from chrominance components of the neutral gray in at least two chrominance channels; calculate a direction angle of a straight line defined by the mapping location point corresponding to the preset chrominance component combination and the first mapping location point corresponding to neutral gray as a target direction angle corresponding to a center mapping location; and determine the center mapping location point in the first reference image based on the target direction angle and an acquired target segment length; where the target segment length is positively correlated with the size of a foreground color rendering range in the color gamut.

In one embodiment, the first target region determining module is further configured to: establish a first polar coordinate system with the center mapping location point as a pole and the color rendering range value as a polar radius; determine a first tangent point and a second tangent point formed by a first target circle and a target tangent based on the first polar coordinate system; where regarding the first target circle, the center mapping location point is taken as a center of a circle, and the color rendering range value is taken as a radius; and the target tangent is a straight line that passes through the first mapping location point corresponding to neutral gray and is tangent to the first target circle; determine, based on the first polar coordinate system, at least one first in-between location point on a first inferior arc on the first target circle formed with the first tangent point and the second tangent point as endpoints; take a line segment formed by the first tangent point, the second tangent point and the at least one first in-between location point as a first target broken line segment; and determine, from a mapping region on the first reference image corresponding to the color gamut of the target color category, a region away from the first mapping location point corresponding to neutral gray and bounded by the first target broken line segment as the first target region.

In one embodiment, the first target region determining module is further configured to: establish a second polar coordinate system with the center mapping location point as a pole and a target value as a polar radius; determine a first extended location point based on the second polar coordinate system; where the first extended location point is on the same line with the first tangent point and the first mapping location point corresponding to neutral gray, and is away from the first mapping location point corresponding to neutral gray; determine a second extended location point based on the second polar coordinate system; where the second extended location point is on the same line with the second tangent point and the first mapping location point corresponding to neutral gray, and is away from the first mapping location point corresponding to neutral gray; determine, based on the second polar coordinate system, at least one second in-between location point on a second inferior arc on the second target circle formed with the first extended location point and the second extended location point as endpoints; where regarding the second target circle, the first mapping location point corresponding to neutral gray is taken as a center of a circle, and the target value is taken as a radius; take a line segment defined by the first extended location point, the second extended location point and the at least one second in-between location point as a second target broken line segment; determine, from the first reference image, a region defined by the second target broken line segment, a first connecting line segment and a second connecting line segment as a mapping region corresponding to a color gamut of the target color category; where the first connecting line segment is a connecting line between the first mapping location point corresponding to neutral gray and the first extended location point; and the second connecting line segment is a connecting line between the first mapping location point corresponding to neutral gray and the second extended location point.

In one embodiment, the apparatus further includes: a gray value filling module configured to configure different location point-based gray values for the first target region and a non-target region in the first reference image, and establish a correspondence between the location point-based gray values and processing eigenvalues; and a processing feature determining module configured to acquire, based on the correspondence between the location point-based gray values and the processing eigenvalues, a processing eigenvalue corresponding to a location point-based gray value of the first mapping location point as a target processing feature corresponding to the pixel point.

In one embodiment, the background of the project image includes an image region belonging to the target color category. in response to that the target processing feature is a transparency characterization value, and a correspondence is present between the location point-based gray value corresponding to the first target region and a first transparency characterization value, and between the location point-based gray value corresponding to the non-target region and a second transparency characterization value, the processing module is further configured to configure a transparency characterization value for each of the pixel points in the project image to remove a target image region from the project image; where the first transparency characterization value is used for shielding a corresponding pixel point in the project image; and the second transparency characterization value is used for displaying a corresponding pixel point in the project image.

In one embodiment, the gray value filling module is further configured to configure a minimum gray value for the first target region in the first reference image; configure a maximum gray value for the non-target region in the first reference image; acquire a preset gradient intensity parameter, and conduct fuzzy processing on the first reference image based on the gradient intensity parameter to acquire an updated first reference image; and establish a correspondence between a gray value of each of pixel points in the updated first reference image and a transparency characterization value of the same value.

In one embodiment, the apparatus further includes: a gray value filling module configured to configure different location point-based gray values for the first target region and a non-target region in the first reference image; and a processing feature determination module configured to determine the target processing feature corresponding to the pixel point as a first processing feature in response to that a location point-based gray value of the first mapping location point in the first reference image matches a location point-based gray value of the first target region; and determine the target processing feature corresponding to the pixel point as a second processing feature different from the first processing feature in response to that a location point-based gray value of first mapping location point in first reference image matches a location point-based gray value of non-target region.

The apparatus further includes a chrominance component updating module configured to acquire a second reference image corresponding to each of chrominance channels; where a second mapping relation is present between each of location points in the second reference image and the chrominance component combination obtained from the chrominance components in at least two chrominance channels; the second reference image includes a second target region; the second target region includes at least a mapping region corresponding to a foreground color rendering range corresponding to the target color category; and a pixel feature of each of location points in the second reference image has an associated chrominance component corresponding to the chrominance channel, and an associated chrominance component corresponding to a pixel feature of the location point in the second target region is consistent with a chrominance component of neutral gray in the chrominance channel; map, based on the second mapping relation, the target chrominance component combination to the second reference image to acquire a second mapping location point corresponding to the pixel point; acquire an associated chrominance component corresponding to a pixel feature of the second mapping location point as an updated chrominance component corresponding to the pixel point; and update the chrominance component of each of pixel points in the project image in the chrominance channel based on the updated chrominance component corresponding to the pixel point.

In one embodiment, the apparatus is further configured to determine, from the second reference image, a mapping region corresponding to a color gamut of the target color category, and determine a region close to a second mapping location point corresponding to neutral gray and bounded by a first target broken line segment as the second target region; fill each of the location points in the second target region with a gray value matching a chrominance component of the neutral gray in the chrominance channel; and fill each of the location points outside the second target region with a gray value matching a corresponding mapping chrominance component on the chrominance channel; and the processing feature determining module is further configured to acquire a chrominance component on the chrominance channel matching a gray value of the second mapping location point in the second reference image to acquire an associated chrominance component.

Each of modules in the image processing device may be implemented entirely or partially through software, hardware, or a combination thereof. Each of the modules may be embedded in or independent of a processor in a computing device in a form of hardware, or may be stored in a memory in the computing device in a form of software to enable the processor to conveniently call and execute an operation corresponding to each of the modules.

Figure 16:
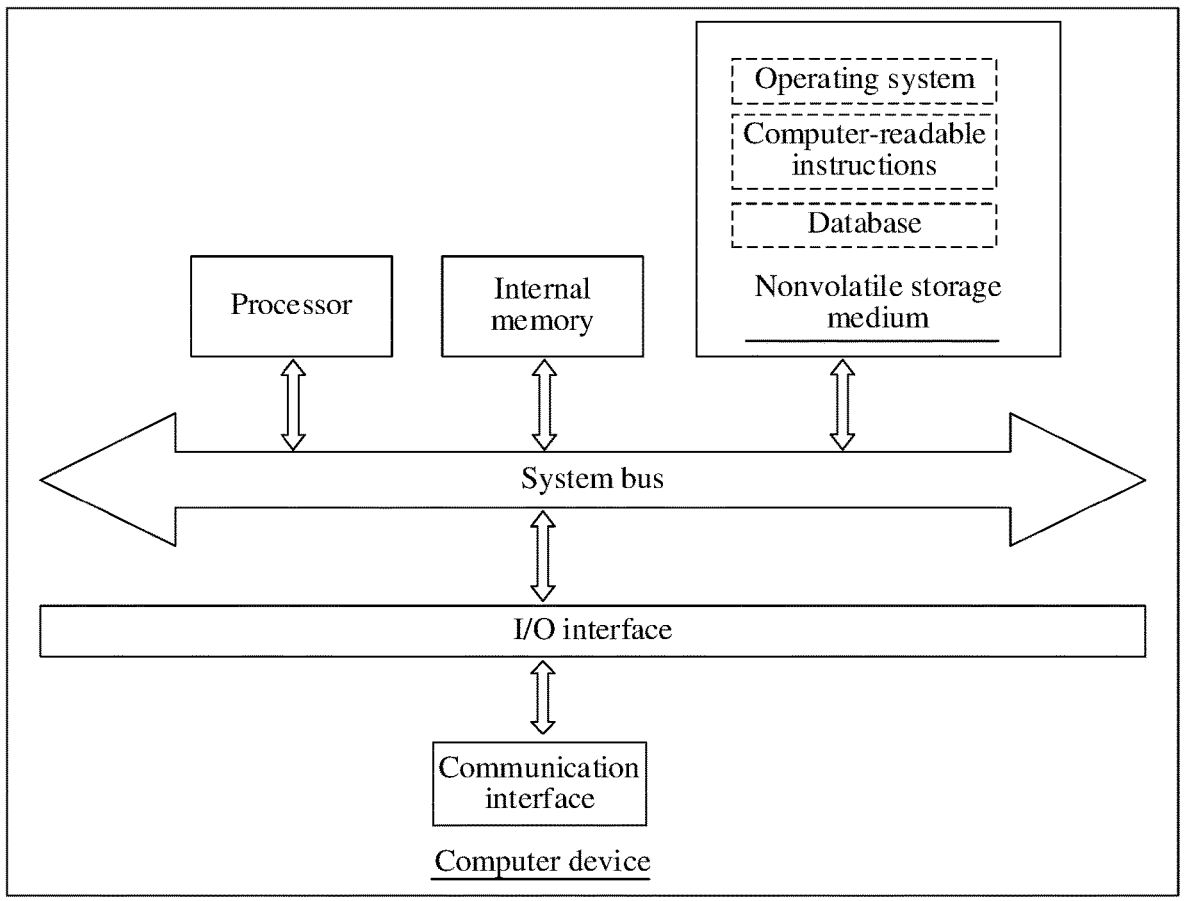
FIG. 16 is a diagram of an internal structure of a computing device according to certain embodiment(s) of the present disclosure.

In one embodiment, a computing device is provided. The computing device may be a server, and an internal structure thereof may be as shown in FIG. 16. The computing device includes a processor, a memory, and a network interface that are connected through a system bus. The processor of the computing device is configured to provide calculation and control capabilities. The memory of the computing device includes a nonvolatile storage medium and an internal memory. The nonvolatile storage medium stores operating system, computer-readable instructions and a database. The internal memory provides an environment for operation of the operating system and the computer-readable instructions in the nonvolatile storage medium. The database of the computing device is configured to store image data. The network interface of the computing device is configured to communicate with an external terminal through a network. The computer-readable instructions are executed by the processor to implement an image processing method.

Figure 17:
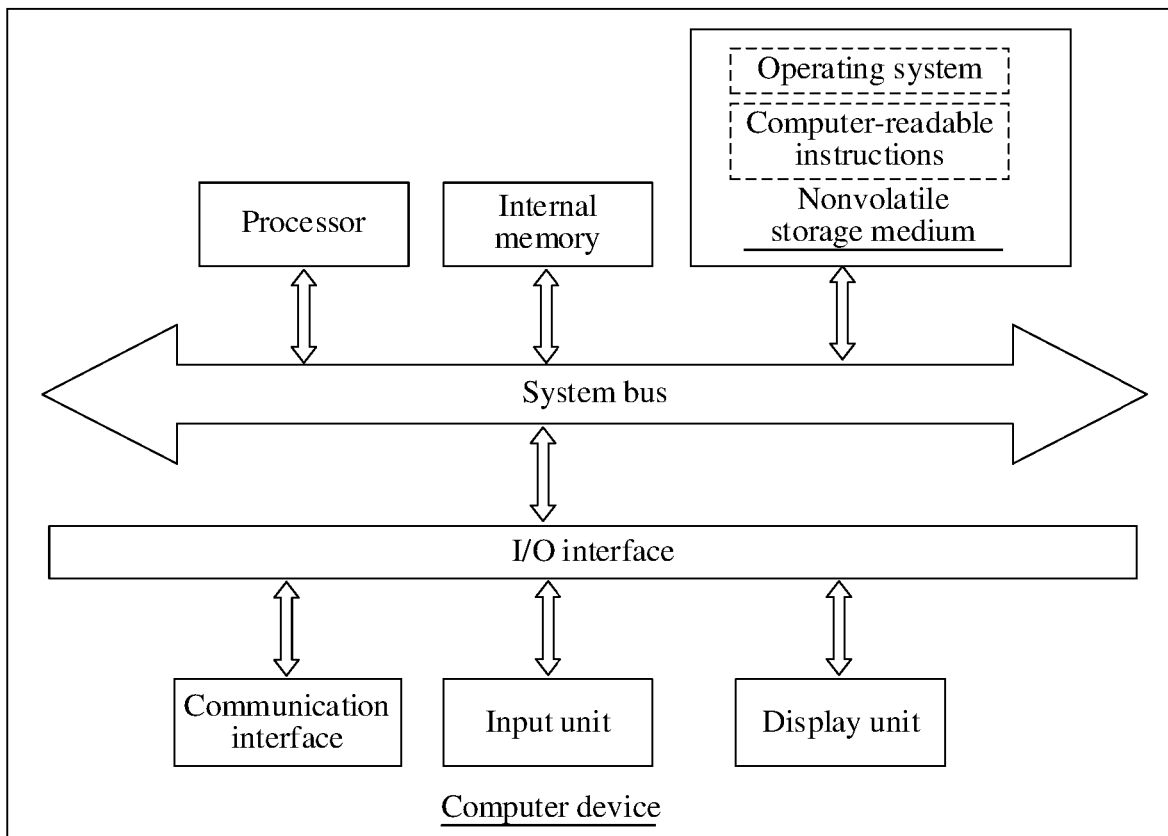
FIG. 17 is a diagram of an internal structure of a computing device according to certain embodiment(s) of the present disclosure.

In one embodiment, a computing device is provided. The computing device may be a terminal, and an internal structure thereof may be as shown in FIG. 17. The computing device includes a processor, a memory, a communication interface, a display, and a input apparatus which are connected through a system bus. The processor of the computing device is configured to provide calculation and control capabilities. The memory of the computing device includes a nonvolatile storage medium and an internal memory. The nonvolatile storage medium stores an operating system and computer-readable instructions. The internal memory provides an environment for operation of the operating system and the computer-readable instructions in the nonvolatile storage medium. The communication interface of the computing device is configured to conduct wired communication or wireless communication with an external terminal. Wireless communication may be implemented through WIFI, mobile cellular network, near-field communication (NFC) or other technologies. The computer-readable instructions are executed by the processor to implement an image processing method. The display of the computing device may be a liquid crystal display or an e-ink display; the input apparatus of the computing device may be a touch layer covering the display, or a key, a trackball or a touchpad set on the housing of the computing device, or an external keyboard, a touchpad or a mouse, etc.

A person skilled in the art may understand that, the structure shown in FIG. 16 and FIG. 17 is merely a block diagram of a partial structure related to a solution in the present disclosure, and does not constitute a limitation to the computing device to which the solution in the present disclosure is applied. In certain embodiment(s), the computing device may include more or fewer components than those shown in the figure, or have some components combined, or have a different component deployment.

In one embodiment, a computing device is provided, including: a memory and a processor, the memory storing computer-readable instructions, the computer-readable instructions, when executed by the processor, causing the processor to perform the steps of the image processing method.

In one embodiment, a computer-readable storage medium is provided, storing computer executable instructions thereon, the computer-readable instructions, when executed by the processor, causing the processor to perform the steps of the image processing method.

In one embodiment, a computer program product is provided, including computer-readable instructions, the computer-readable instructions, when executed by the processor, causing the processor to perform the steps of the image processing method.

It is to be understood that, user information (including but not limited to user's equipment information, user's personal information, etc.) and data (including but not limited to data for analysis, storage and display) involved in the present disclosure are information and data authorized by users or authorized by various parties.

A person of ordinary skill in the art may understand that all or some of procedures of the method in the embodiments may be implemented by computer-readable instructions instructing relevant hardware. The computer-readable instructions may be stored in a nonvolatile computer-readable storage medium. When the computer-readable instruction is executed, the procedures of the method embodiments may be implemented. Any reference to a memory, a database, or other media used in various embodiments of the present disclosure may include a nonvolatile memory and/or a volatile memory. The non-volatile memory may include a read-only memory (ROM), a tape, a floppy disk, a flash memory, an optical memory, a high-density embedded non-volatile memory, a resistive random access memory (Re-RAM), a magnetoresistive random access memory (MRAM), a ferroelectric random access memory (FRAM), a phase change memory (PCM), a graphene memory, etc. The volatile memory may include a random access memory (RAM) or an external cache like memory or the like. As description rather than limitation, the RAM may be in a plurality of forms, such as a static random access memory (SRAM), a dynamic random access memory (DRAM), or the like. Databases involved in the embodiments of the present disclosure may include at least one of a relational database and a non-relational database. The non-relational database may include, but are not limited to a distributed database based on block chains. Processors involved in the embodiments of the present disclosure may be, but are not limited to a general-purpose processor, a central processing unit, a graphics processor, a digital signal processor, a programmable logic device, a data processing logic device based on quantum computing, etc.

The term unit (and other similar terms such as subunit, module, submodule, etc.) in this disclosure may refer to a software unit, a hardware unit, or a combination thereof. A software unit (e.g., computer program) may be developed using a computer programming language. A hardware unit may be implemented using processing circuitry and/or memory. Each unit may be implemented using one or more processors (or processors and memory). Likewise, a processor (or processors and memory) may be used to implement one or more units. Moreover, each unit may be part of an overall unit that includes the functionalities of the unit.

Technical features of the embodiments may be randomly combined. To make description concise, not all possible combinations of the technical features in the embodiments are described. However, the combinations of these technical features shall be considered as falling within the scope recorded by this specification in response to that no conflict exists.

The embodiments show only several implementations of the present disclosure and are described in detail, which, however, are not to be construed as a limitation to the patent scope of the present disclosure. It is to be pointed out that those of ordinary skill in the art may further make variations and improvements without departing from the concept of the present disclosure. These variations and improvements all fall within the protection scope of the present disclosure.

Therefore, the protection scope of the present disclosure shall be subject to the appended claims.

What is claimed is:

1. An image processing method executed by a computing device, the method comprising:

acquiring a project image, and acquiring a target chrominance component combination corresponding to each of pixel points in the project image, wherein the target chrominance component combination is obtained from chrominance components of the pixel point in at least two chrominance channels respectively;

acquiring a first reference image, wherein a first mapping relation is present between each of location points in the first reference image and a chrominance component combination obtained from chrominance components in the at least two chrominance channels; the first reference image includes a first target region; the first target region is a region in which mapping location points corresponding to a target color category are distributed; the mapping location points corresponding to the target color category are obtained by mapping a candidate chrominance component combination of the target color category; and the candidate chrominance component combination is obtained from chrominance components of a candidate color of the target color category in the at least two chrominance channels, respectively;

mapping, based on the first mapping relation, the target chrominance component combination to the first reference image to acquire a first mapping location point corresponding to the pixel point;

determining a target processing feature corresponding to the pixel point according to a pixel feature of the first mapping location point in the first reference image; wherein the target processing feature matches a target location relation; and the target location relation characterizes a location relation between the first mapping location point and the first target region; and processing the project image based on the target processing feature of each of the pixel points.

2. The method according to claim 1, wherein the first target region is determined by:

acquiring a preset chrominance component combination, and mapping the preset chrominance component combination to the first reference image based on the first mapping relation to acquire a mapping location point corresponding to the preset chrominance component combination;

acquiring a color rendering range value corresponding to a desired background color rendering range of the target color category; wherein the color rendering range value is positively correlated with the size of the desired background color rendering range;

determining a center mapping location point corresponding to the desired background color rendering range on the first reference image based on the mapping location point corresponding to the preset chrominance component combination; and determining the first target region on the first reference image based on the center mapping location point and the color rendering range value.

3. The method according to claim 2, wherein acquiring the color rendering range value comprises:

acquiring an inputted color gamut angle and a target segment length; wherein the color gamut angle is positively correlated with the size of a color gamut of the target color category in a target color space; the target color space is a color space determined according to the at least two chrominance channels; and the target segment length is positively correlated with the size of a foreground color rendering range in the color gamut; and determining the color rendering range value based on the color gamut angle and the target segment length.

4. The method according to claim 2, wherein determining the center mapping location point comprises:

acquiring a first mapping location point corresponding to neutral gray; wherein the first mapping location point corresponding to the neutral gray is obtained by mapping a chrominance component combination corresponding to the neutral gray to the first reference image; and the chrominance component combination corresponding to the neutral gray is obtained from chrominance components of the neutral gray in the at least two chrominance channels;

calculating a direction angle of a straight line defined by the mapping location point corresponding to the preset chrominance component combination and the first mapping location point corresponding to the neutral gray as a target direction angle corresponding to a center mapping location; and determining the center mapping location point in the first reference image based on the target direction angle and an acquired target segment length; wherein the target segment length is positively correlated with the size of a foreground color rendering range in a color gamut corresponding to the target color category.

5. The method according to claim 2, wherein determining the first target region on the first reference image comprises:

establishing a first polar coordinate system with the center mapping location point as a pole and the color rendering range value as a polar radius, determining a first tangent point and a second tangent point formed by a first target circle and a target tangent based on the first polar coordinate system; wherein regarding the first target circle, the center mapping location point is taken as a center of a circle, and the color rendering range value is taken as a radius; and the target tangent is a straight line that passes through the first mapping location point corresponding to the neutral gray and is tangent to the first target circle;

determining, based on the first polar coordinate system, at least one first in-between location point on a first inferior arc on the first target circle formed with the first tangent point and the second tangent point as endpoints;

taking a line segment formed by the first tangent point, the second tangent point and the at least one first in-between location point as a first target broken line segment; and determining, from a mapping region on the first reference image corresponding to the color gamut of the target color category, a region away from the first mapping location point corresponding to the neutral gray and bounded by the first target broken line segment as the first target region.

6. The method according to claim 5, further comprising:

establishing a second polar coordinate system with the center mapping location point as a pole and a target value as a polar radius;

determining a first extended location point based on the second polar coordinate system; wherein the first extended location point is on the same line with the first tangent point and the first mapping location point corresponding to the neutral gray, and is away from the first mapping location point corresponding to the neutral gray;

determining a second extended location point based on the second polar coordinate system; wherein the second extended location point is on the same line with the second tangent point and the first mapping location point corresponding to the neutral gray, and is away from the first mapping location point corresponding to the neutral gray;

determining, based on the second polar coordinate system, at least one second in-between location point on a second inferior arc on the second target circle formed with the first extended location point and the second extended location point as endpoints; wherein regarding the second target circle, the first mapping location point corresponding to the neutral gray is taken as a center of a circle, and the target value is taken as a radius; and taking a line segment defined by the first extended location point, the second extended location point and the at least one second in-between location point as a second target broken line segment; and determining, from the first reference image, a region defined by the second target broken line segment, a first connecting line segment and a second connecting line segment as a mapping region corresponding to a color gamut of the target color category; wherein the first connecting line segment is a connecting line between the first mapping location point corresponding to the neutral gray and the first extended location point; and the second connecting line segment is a connecting line between the first mapping location point corresponding to the neutral gray and the second extended location point.

7. The method according to claim 1, further comprising:
configuring different location point-based gray values for the first target region and a non-target region in the first reference image, and establishing a correspondence between the location point-based gray values and processing eigenvalues; and determining the target processing feature corresponding to the pixel point comprises:
based on the correspondence between the location point-based gray values and the processing eigenvalues, acquiring a processing eigenvalue corresponding to a location point-based gray value of the first mapping location point as a target processing feature corresponding to the pixel point.

8. The method according to claim 7, wherein a background of the project image includes an image region belonging to the target color category; and the processing the project image based on the target processing feature of each of the pixel points comprises:
in response to that the target processing feature is a transparency characterization value, and a correspondence is present between the location point-based gray value corresponding to the first target region and a first transparency characterization value, and between the location point-based gray value corresponding to the non-target region and a second transparency characterization value, configuring a transparency characterization value for each of the pixel points in the project image to remove a target image region from the project image; wherein the first transparency characterization value is used in shielding a corresponding pixel point in the project image; and the second transparency characterization value is used in displaying a corresponding pixel point in the project image.

9. The method according to claim 7, wherein configuring the different location point-based gray values comprises:
configuring a minimum gray value for the first target region in the first reference image;
configuring a maximum gray value for the non-target region in the first reference image;
acquiring a preset gradient intensity parameter, and conducting fuzzy processing on the first reference image based on the gradient intensity parameter to acquire an updated first reference image; and
establishing a correspondence between a gray value of each of pixel points in the updated first reference image and a transparency characterization value of the same value.

10. The method according to claim 1, further comprising:
configuring different location point-based gray values for the first target region and a non-target region in the first reference image; and
determining the target processing feature corresponding to the pixel point comprises:
determining the target processing feature corresponding to the pixel point as a first processing feature in response to that a location point-based gray value of the first mapping location point in the first reference image matches a location point-based gray value of the first target region; and
determining the target processing feature corresponding to the pixel point as a second processing feature different from the first processing feature in response to that a location point-based gray value of the first mapping location point in the first reference image matches a location point-based gray value of the non-target region.

11. The method according to claim 1, further comprising:
acquiring a second reference image corresponding to each of chrominance channels; wherein a second mapping relation is present between each of location points in the second reference image and the chrominance component combination obtained from the chrominance components in the at least two chrominance channels; the second reference image includes a second target region; the second target region includes at least a mapping region corresponding to a foreground color rendering range corresponding to the target color category; and a pixel feature of each of location points in the second reference image has an associated chrominance component corresponding to the chrominance channel, and an associated chrominance component corresponding to a pixel feature of the location point in the second target region is consistent with a chrominance component of the neutral gray in the chrominance channel;

mapping, based on the second mapping relation, the target chrominance component combination to the second reference image to acquire a second mapping location point corresponding to the pixel point;

acquiring an associated chrominance component corresponding to a pixel feature of the second mapping location point as an updated chrominance component corresponding to the pixel point; and updating the chrominance component of each of pixel points in the project image in the chrominance channel based on the updated chrominance component corresponding to the pixel point.

12. The method according to claim 11, further comprising:
   determining, from the second reference image, a mapping region corresponding to a color gamut of the target color category, and determining a region close to a second mapping location point corresponding to the neutral gray and bounded by a first target broken line segment as the second target region;
   filling each of the location points in the second target region with a gray value matching a chrominance component of the neutral gray in the chrominance channel; and
   filling each of the location points outside the second target region with a gray value matching a corresponding mapping chrominance component on the chrominance channel; and
   acquiring the associated chrominance component comprises:
   acquiring a chrominance component on the chrominance channel matching a gray value of the second mapping location point in the second reference image to acquire an associated chrominance component.

13. The method according to claim 12, wherein determining the mapping region comprises:
   establishing a second polar coordinate system with the center mapping location point as a pole and a target value as a polar radius;
   determining a first extended location point and a second extended location point based on the second polar coordinate system;
   determining, based on the second polar coordinate system, at least one second in-between location point on a second inferior arc on the second target circle formed with the first extended location point and the second extended location point as endpoints; wherein regarding the second target circle, the first mapping location point corresponding to the neutral gray is taken as a center of a circle, and the target value is taken as a radius;
   taking a line segment defined by the first extended location point, the second extended location point and the at least one second in-between location point as a second target broken line segment; and
   determining, from the second reference image, a region defined by the second target broken line segment, a first connecting line segment and a second connecting line segment as a mapping region corresponding to a color gamut of the target color category; wherein
   the first connecting line segment is a connecting line between the first mapping location point corresponding to the neutral gray and the first extended location point; and the second connecting line segment is a connecting line between the first mapping location point corresponding to the neutral gray and the second extended location point.

14. The method according to claim 12, further comprising:
   acquiring a preset gradient intensity parameter, and conducting fuzzy processing on the second reference image based on the gradient intensity parameter to update a gray value of the second reference image; wherein
   the fuzzy processing includes at least one of mean fuzzy processing, Gaussian fuzzy processing or convolution kernel-based fuzzy processing.

15. An image processing apparatus, comprising: a memory storing computer program instructions; and a processor coupled to the memory and configured to execute the computer program instructions and perform:
   acquiring a project image, and acquiring a target chrominance component combination corresponding to each of pixel points in the project image, wherein the target chrominance component combination is obtained from chrominance components of the pixel point in at least two chrominance channels respectively;
   acquiring a first reference image, wherein a first mapping relation is present between each of location points in the first reference image and a chrominance component combination obtained from chrominance components in the at least two chrominance channels; the first reference image includes a first target region; the first target region is a region in which mapping location points corresponding to a target color category are distributed; the mapping location points corresponding to the target color category are obtained by mapping a candidate chrominance component combination of the target color category; and the candidate chrominance component combination is obtained from chrominance components of a candidate color of the target color category in the at least two chrominance channels, respectively;
   mapping, based on the first mapping relation, the target chrominance component combination to the first reference image to acquire a first mapping location point corresponding to the pixel point;
   determining a target processing feature corresponding to the pixel point according to a pixel feature of the first mapping location point in the first reference image; wherein the target processing feature matches a target location relation; and the target location relation characterizes a location relation between the first mapping location point and the first target region; and
   processing the project image based on the target processing feature of each of the pixel points.

16. The image processing apparatus according to claim 15, wherein the first target region is determined by:
   acquiring a preset chrominance component combination, and mapping the preset chrominance component combination to the first reference image based on the first mapping relation to acquire a mapping location point corresponding to the preset chrominance component combination;
   acquiring a color rendering range value corresponding to a desired background color rendering range of the target color category; wherein the color rendering range value is positively correlated with the size of the desired background color rendering range;
   determining a center mapping location point corresponding to the desired background color rendering range on the first reference image based on the mapping location point corresponding to the preset chrominance component combination; and
   determining the first target region on the first reference image based on the center mapping location point and the color rendering range value.

17. The image processing apparatus according to claim 15, wherein the processor is configured to execute the computer program instructions and further perform:
   configuring different location point-based gray values for the first target region and a non-target region in the first reference image, and establishing a correspondence between the location point-based gray values and processing eigenvalues; and determining the target processing feature corresponding to the pixel point includes:

based on the correspondence between the location point-based gray values and the processing eigenvalues, acquiring a processing eigenvalue corresponding to a location point-based gray value of the first mapping location point as a target processing feature corresponding to the pixel point;

parameter to acquire an updated first reference image; and establishing a correspondence between a gray value of each of pixel points in the updated first reference image and a transparency characterization value of the same value.

18. The image processing apparatus according to claim 15, wherein the processor is configured to execute the computer program instructions and further perform:

configuring different location point-based gray values for the first target region and a non-target region in the first reference image; and determining the target processing feature corresponding to the pixel point includes:

determining the target processing feature corresponding to the pixel point as a first processing feature in response to that a location point-based gray value of the first mapping location point in the first reference image matches a location point-based gray value of the first target region; and determining the target processing feature corresponding to the pixel point as a second processing feature different from the first processing feature in response to that a location point-based gray value of the first mapping location point in the first reference image matches a location point-based gray value of the non-target region.

19. The image processing apparatus according to claim 15, wherein the processor is configured to execute the computer program instructions and further perform:

acquiring a second reference image corresponding to each of chrominance channels; wherein a second mapping relation is present between each of location points in the second reference image and the chrominance component combination obtained from the chrominance components in the at least two chrominance channels; the second reference image includes a second target region; the second target region includes at least a mapping region corresponding to a foreground color rendering range corresponding to the target color category; and a pixel feature of each of location points in the second reference image has an associated chrominance component corresponding to the chrominance channel, and an associated chrominance component corresponding to a pixel feature of the location point in the second target region is consistent with a chrominance component of the neutral gray in the chrominance channel;

mapping, based on the second mapping relation, the target chrominance component combination to the second reference image to acquire a second mapping location point corresponding to the pixel point;

acquiring an associated chrominance component corresponding to a pixel feature of the second mapping location point as an updated chrominance component corresponding to the pixel point; and updating the chrominance component of each of pixel points in the project image in the chrominance channel based on the updated chrominance component corresponding to the pixel point.

20. A non-transitory computer-readable storage medium storing computer program instructions executable by at least one processor to perform:

acquiring a project image, and acquiring a target chrominance component combination corresponding to each of pixel points in the project image, wherein the target chrominance component combination is obtained from chrominance components of the pixel point in at least two chrominance channels respectively;

acquiring a first reference image, wherein a first mapping relation is present between each of location points in the first reference image and a chrominance component combination obtained from chrominance components in the at least two chrominance channels; the first reference image includes a first target region; the first target region is a region in which mapping location points corresponding to a target color category are distributed; the mapping location points corresponding to the target color category are obtained by mapping a candidate chrominance component combination of the target color category; and the candidate chrominance component combination is obtained from chrominance components of a candidate color of the target color category in the at least two chrominance channels, respectively;

mapping, based on the first mapping relation, the target chrominance component combination to the first reference image to acquire a first mapping location point corresponding to the pixel point;

determining a target processing feature corresponding to the pixel point according to a pixel feature of the first mapping location point in the first reference image; wherein the target processing feature matches a target location relation; and the target location relation characterizes a location relation between the first mapping location point and the first target region; and processing the project image based on the target processing feature of each of the pixel points.

* * * * *